United States Patent [19]

Gagliardo et al.

[11] Patent Number: 5,043,874
[45] Date of Patent: Aug. 27, 1991

[54] MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY

[75] Inventors: Michael A. Gagliardo, Shrewsbury; James E. Tessari, Arlington; John Lynch, Wayland; Kumar Chinnaswamy, Milford, all of Mass.

[73] Assignee: Digital Equipment Corporation, Maynard, Mass.

[21] Appl. No.: 306,404

[22] Filed: Feb. 3, 1989

[51] Int. Cl.⁵ ............................................. G06F 13/14
[52] U.S. Cl. ................................. 364/200; 364/228.1; 364/238.4; 364/245.5
[58] Field of Search ... 364/200 MS File, 900 MS File

[56] References Cited

U.S. PATENT DOCUMENTS

| | | | |
|---|---|---|---|
| 3,787,818 | 1/1974 | Arnold et al. | 364/200 |
| 4,037,210 | 7/1977 | Sharp | 364/200 |
| 4,207,609 | 6/1980 | Luiz et al. | 364/200 |
| 4,371,929 | 2/1983 | Brann et al. | 364/200 |
| 4,392,200 | 7/1983 | Arulpragasam | 340/200 |
| 4,449,183 | 5/1984 | Flahive et al. | 364/200 |
| 4,500,958 | 2/1985 | Manton et al. | 364/200 |
| 4,543,626 | 9/1985 | Bean et al. | 364/200 |
| 4,543,628 | 9/1985 | Pomfret | 364/200 |
| 4,876,643 | 10/1989 | McNeill et al. | 364/200 |

FOREIGN PATENT DOCUMENTS

| | | |
|---|---|---|
| 0147295 | 7/1985 | European Pat. Off. |
| 0248906 | 4/1987 | European Pat. Off. |
| 2171542 | 8/1986 | United Kingdom |

OTHER PUBLICATIONS

Fossum et al., "An Overview of the VAX 8600 System", Digital Technical Journal, No. 1, Aug. 1985, pp. 8-23.

Troiani et al., "The VAX 8600 I Box, A Pipelined Implementation of the VAX Architecture", Digital Technical Journal, No. 1, Aug. 1985, pp. 24-42.

Levy and Eckhouse, Jr., Computer Programming and Architecture, The VAX-11, Digital Equipment Corporation, 1980, pp. 263-276, 296-303, 351-368.

G. Desrochers, Principles of Parallel and Multiprocessing, Intertext Publications, Inc., McGraw-Hill Book Co., 1987, pp. 68-71.

Smith, A. J., "Cache Memory Design: An Evolving ARt", IEEE Spectrum, Dec. 1987, pp. 40-44.

P. J. Bagnal, "Hierarchical RAMS for Static-Like Speeds", WESCON, vol. 29, Nov. 1985, pp. 1-4.

Primary Examiner—Michael R. Fleming
Assistant Examiner—Debra A. Chun
Attorney, Agent, or Firm—Arnold, White & Durkee

[57] ABSTRACT

In a multi-processing computer system including a plurality of central processing units (CPUs) and input/output (I/O) units, a system memory including a plurality of DRAM-based memory segments, a system control unit (SCU) for operating the CPUs in a parallel fashion and allowing the CPUs and other system units to controllably access addressable segments of system memory, and an interface for establishing communication between the SCU and the system memory and regulating the transfer of memory commands and associated data therebetween, the system memory is configured in the form of at least one independently accessible memory unit having a first dedicated data path for the transfer of read data from addressed memory segments to the interface for transfer to the SCU, a second dedicated data path for transfer of write data received from the SCU through the interface to addressed memory segments, and a third dedicated path for transfer of addresses from the SCU to identify addressed segment of memory.

13 Claims, 15 Drawing Sheets ized as U.S. Pat. No. 4,985,825 on Jan. 15, 1991; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989; Hetherington, WRITE BACK BUFFER WITH ERROR CORRECTING CAPABILITIES, Ser. No. 07/306,703 filed Feb. 3, 1989, and issued as U.S. Pat. No. 4,995,041 on Feb. 19, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; Chinnasway et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov.. 6, 1990; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 33, 1989, and issued as U.S. Pat. No. 4,965,793 on Oct. 23, 1990; and Gagliardoo et al., METHOD AND MEANS FOR ERROR CHECKING OF DRAM-CONTROL SIGNALS BETWEEN SYSTEM MODULES, Ser. No. 07/306,836 filed Feb. 3, 1989.

MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3,1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3,1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,767 Feb. 3, 1989; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3 1989; D. Fite et all., DECODING MULTIPLE SPECIFIERS IN A VARIABLE LENGTH INSTRUCTION ARCHITECTURE, Ser. No. 07/307/347 filed Feb. 3, 1981; D. Fite et al., VIRTUAL INSTRUCTION CACHE REFILL ALGORITHM, Ser. No. 07/306,831 filed Feb. 3, 1989; Murray et al., PIPELINE PROCESSING OR REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989; Murray et al., PREPROCESSING IMPLIED SPECIFIERS IN A PIPELINED PROCESSOR, Ser. No. 07/306,846 filed Feb. 3, 1989; D. Fite et al., BRANCH PREDICTION, Ser. No. 07/306,760 filed Feb. 3, 1989; Fossum et al., PIPELINED FLOATING POINT ADDER FOR DIGITAL COMPUTER, Ser. No. 07/306,343 filed Feb. 3, 1989, and issued as U.S. Pat. No. 4,994,996 on Feb. 19, 1991; Grundmann et al., SELF TIMED REGISTER FILE, Ser. No. 07/306,445 filed Feb. 3, 1989; Beaven et al., METHOD AND APPARATUS FOR DETECTING AND CORRECTING ERRORS IN A PIPELINED COMPUTER SYSTEM, Ser. No. 07/306,828 filed Feb. 3, 1989 and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989; Webb, Jr., et al., PROCESSING OF MEMORY ACCESS EXCEPTIONS WITH PREFETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989, and issued as

TECHNICAL FIELD

This invention relates generally to multiprocessor computer systems. More particularly, this invention relates to a memory configuration suitable for use with an interface provided between the system control unit used for operating a plurality of processors in a parallel fashion and the main system memory in a multi-processing system for efficient interaction between each of the plurality of processors and the various modules comprising the system memory.

DESCRIPTION OF RELATED ART

A variety of super computers are available today which are directed to satisfying high-performance computing needs; the high performance, typically providing operating speeds well exceeding 100-125 million floating point operations per second (Mega-FLOPS), is normally achieved at prohibitive costs and at the expense of user friendliness and convenient interaction ability. At the lower end of the performance spectrum, a large number of computer systems exist today which do satisfy less complex computing needs; these systems, however, are severely restricted as to memory capacity as well as input/output (I/0) capacity.

The "VAX" brand family of computers from Digital Equipment Corporation, Maynard, Massachusetts 01754, is aimed at computing needs falling mid-range of the performance spectrum; this family of computers has been extremely successfully by virtue of ease-of-programming, compatibility, good cost/performance ratio, and higher reliability. However, there exists a demand for extension of the popular VAX characteristics to a computer system which provides increased performance in combination with substantially larger memory and input/output capacity without being subjected to the traditional disadvantages of super computers, i.e., restrictive cost and lack of user-friendliness and interaction.

High performance computers are generally based upon the concept of multi-processing at the system level wherein a plurality of processors are used to work on a defined task through appropriate problem decomposition. Such multi-processing is also complemented by the process of pipelining, in which a given computer instruction is divided into a series of smaller and less complex operations which are executed in a pipeline fashion by several dedicated functional units that are optimized for specific purposes. In such systems, multiple I/0 buses are used to provide parallel paths to mass storage and other devices in order to achieve high speed and extensive connectivity and redundancy.

In extending the VAX type of architecture and the associated system characteristics and instruction set to high performance computer systems, a system control unit (SCU) may be used to coordinate the parallel operation of the plurality of central processor units (CPU's) comprising the multi-processing system in conjunction with the main system memory, I/0 devices and other components of the computing system. In a system of this type, each of the system components must be ported into the SCU which in turn has to link all ports together in a manner analogous to functions traditionally provided by system buses. The SCU functions, among other things, to keep all system components active while avoiding inter-unit conflicts by the use of extensive communication and validity checking.

The ability of each of the system units, particularly the CPU's, to independently access memory is critical to realizing efficient parallel and pipelined operation, and one of the main functions of the SCU is to manage memory access in a manner which most efficiently allows the system units to run in parallel. A critical aspect of this operation is providing an efficient SCU/main memory interface which regulates parallel access for each of the system CPU's to the various modules comprising the main memory of the system. It is also important that the system memory be configured and controlled in a manner which is compatible with and particularly adapted to the provision of such an efficient interface.

SUMMARY OF THE INVENTION

A memory configuration adapted for use with interface means between a System Control Unit (SCU) and a main memory in a multi-processing system comprises at least one memory unit containing independently accessible DRAM based memory segments, each memory unit comprising means for providing a first dedicated data path for the transfer of read data (the "read path") from address memory segments to the interface means for transfer to the SCU, means for providing a second dedicated data path (the "write path") for transfer of write data received from the SCU through the interface means to addressed memory segments, and means for providing a third dedicated path for transfer of memory addresses (the "address path") from the SCU for identification of addressed memory segments.

According to a preferred embodiment of this invention, each MMU of the main memory is split between two memory ports on the SCU and the data storage section of each MMU comprises a pair of segments each comprising a pair of DRAM based memory banks. The memory addresses for the memory banks are interleaved on boundaries of blocks having a predetermined size corresponding to the size of cache blocks used in the system CPUs. Each memory segment is operated independently while a common data path is shared by the segments. The two banks comprising each MMU segment are controlled in such a way that only one bank may be active for a given memory command by providing different address lines to the segments while retaining common data lines.

In accordance with a preferred logic implementation, a single MMU is made up of a plurality of memory modules (MMs) each comprising a main array card (MAC) module which provides buffering of write and read data, maintains integrity of DRAM data during power failure, and provides connections and logic support for additional storage modules. DRAM data path (DDP) modules are provided on each memory module for handling level translation between logic levels, provision of the read data path and related buffering, provision of the right data path and related buffering, and provision of a DRAM by-pass path for special memory operations. Each memory module also includes a DRAM control and address (DCA) module for level translation, buffering of DRAM-related control signals, and generation of appropriate system control commands The memory configuration according to this invention is particularly adapted for use with dedicated interface means provided between the SCU and the system main memory of the type disclosed in the above mentioned co-pending application Ser. No. 07/306,326, filed Feb. 3, 1989, by Gagliardo et al. titled "Method And Means For Interfacing A System Control Unit For A Multi-Processor System With The System Main Memory," the disclosure in which is incorporated in full herein by reference.

BRIEF DESCRIPTION OF THE DRAWINGS

Other objects and advantages of the invention will become apparent upon reading the following detailed description and upon reference to the drawings in which.

Figure 1:
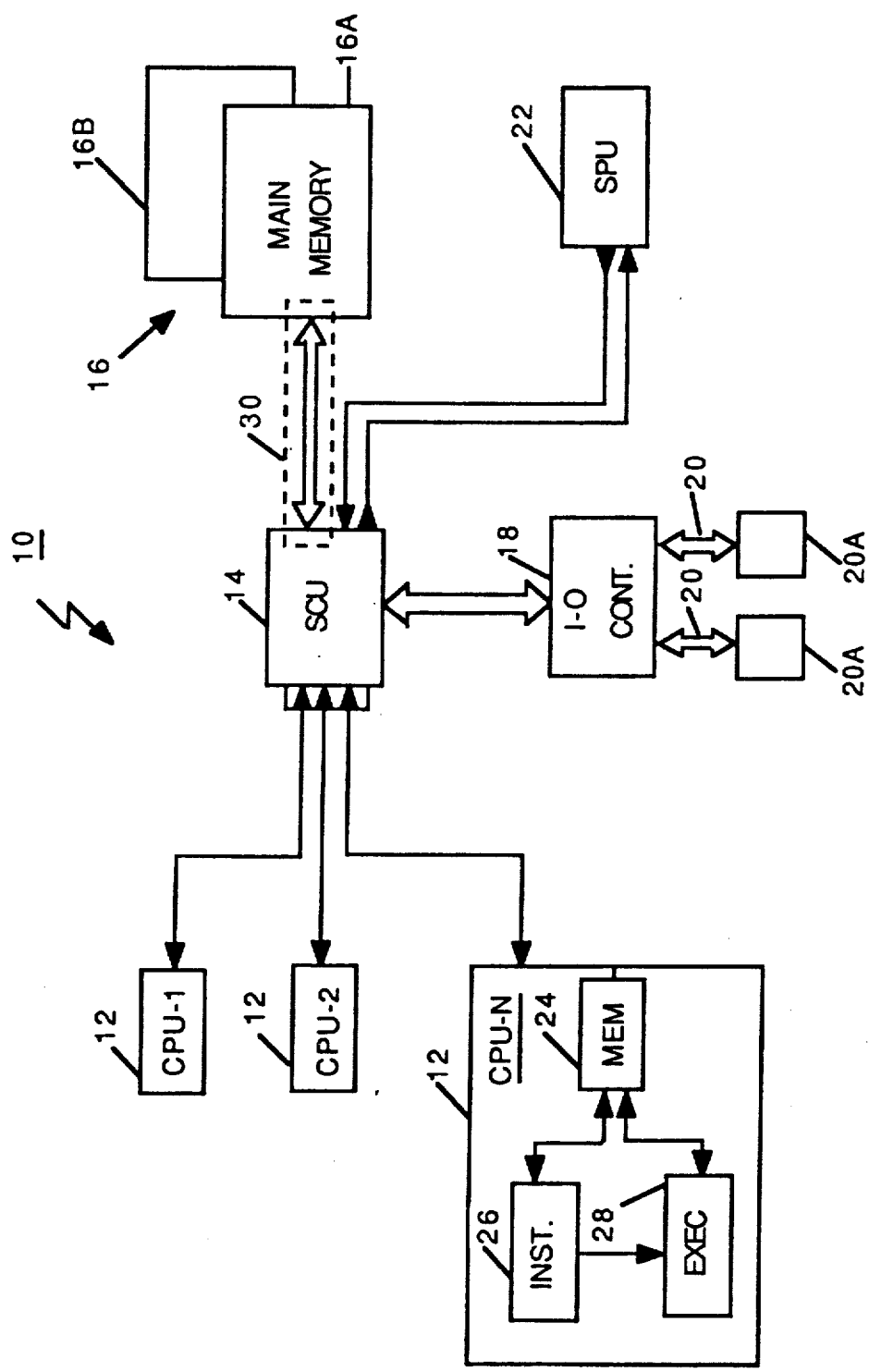
FIG. 1 is a simplified block diagram representing the use of the present invention in a multi-processing computer system in which a plurality of processors are operated under the control of a system control unit (SCU)

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Referring now to FIG. 1, there is shown a simplified block diagram of a multiprocessing system 10 which uses a plurality of central processing units (CPUs) 12 and is configured to permit simultaneous, i.e., parallel operation, of the system CPUs by allowing them to share a common main memory 16 for the system. The main memory 16 itself typically comprises a plurality of memory modules or units 16A and 16B. A system control unit (SCU) 14 links the CPUs 12 to the main memory 16 and to the input output (I/0) controller 18 which allows the processing system in general and the CPUs in particular to communicate with the external world through appropriate I/0 interfaces 20 and associated I/0 units 20A for the system. The SCU 14 also links the various system modules to a service processor/console unit (SPU) 22 which performs traditional console functions including status determination and the control of the overall operation of the processing system. In particular, the SCU 14 provides the SPU 22 with means for communicating with the plurality of CPUs 12 and provides access to all storage elements in the CPUs.

Efficient communication between all system units ported into the SCU 14 and the main memory 16, and more particularly between each of the CPUs 12 and the main memory 16, is critical for insuring efficient parallel operation of the processing system. According to this invention, this critical operation is provided by means of a dedicated interface means 30 linking the SCU 14 and the main memory 16. The interface 30 provides the SCU 14 with means for interfacing and controlling the various modules comprising the main memory 16 in response to memory interaction commands or signals received from each of the CPUs 12 or I/0 units 20A that are ported into the SCU.

Although the interface means 30 of this invention, which will be described in detail below, is not restricted to any particular CPU architecture, it should be noted that each CPU 12 typically includes a memory module 24 which provides the CPU interface to memory, I/0 and other CPU units. In particular, the memory module serves as means for accepting memory references, usually virtual, translating the references to physical addresses, and initiating accesses to memory data, either in main memory through the SCU 14 and the interface means 30 or within a local cache. Each CPU 12 also includes an instruction module 26 for fetching instructions, decoding operation codes (op-codes) and specifiers, fetching operands, and updating the system program counter. In addition, each CPU has an execution module 28 which serves as the execution stage for decoded instructions and fetched operands provided by the other CPU modules.

Figure 2:
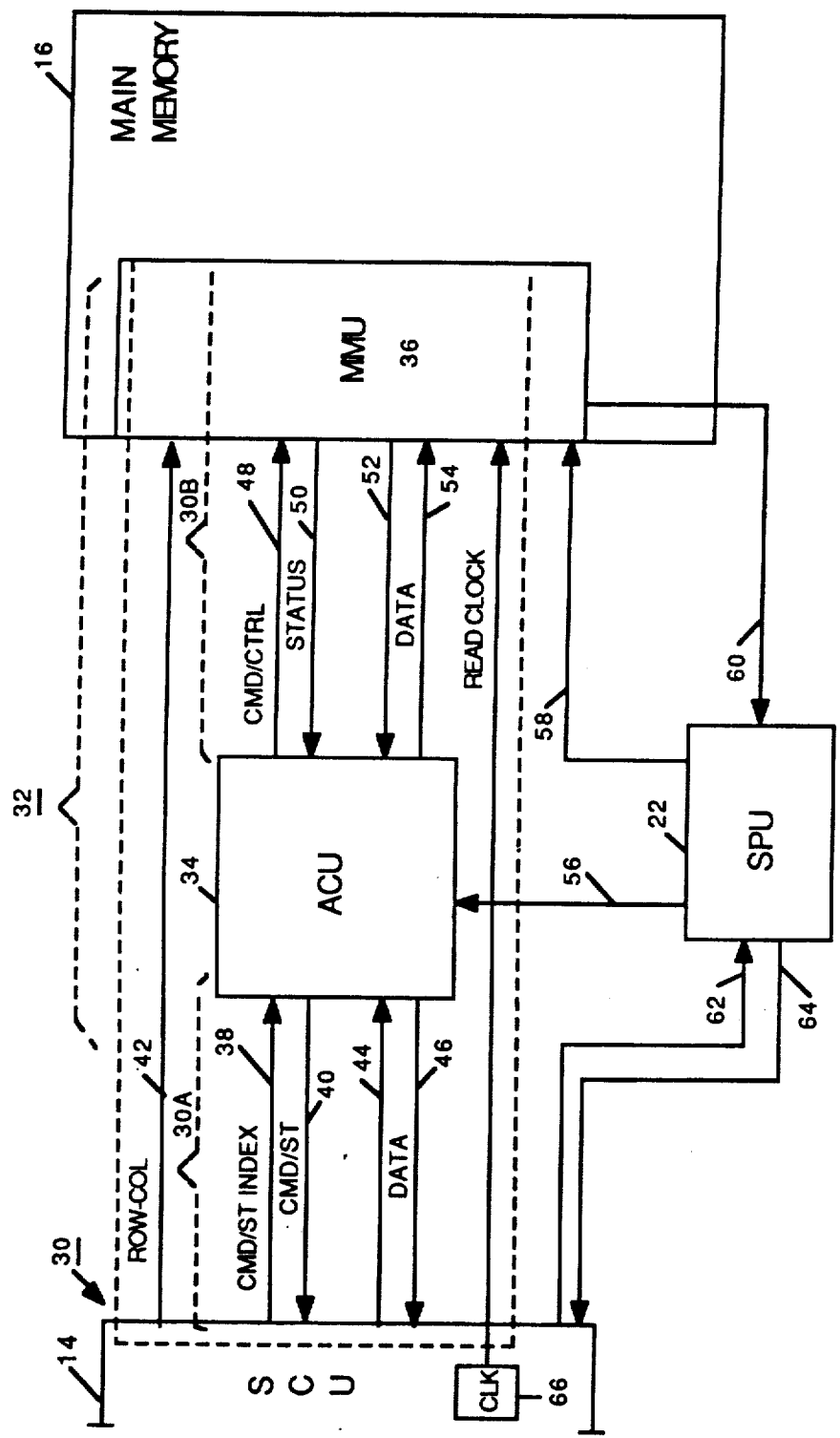
FIG. 2 is a block diagrammatic illustration of the memory sub-system that serves as the communication link between the SCU and the system memory according to this invention.

Referring now to FIG. 2, there is shown a preferred embodiment of dedicated interface means 30 linking the SCU 14 to the main memory 16 according to the system of this invention. The interface means 30 is provided in the form of a memory sub-system 32 essentially comprising an array control unit (ACU) 34 which accepts command signals and data transfer requests from the SCU and a main memory unit (MMU) 36 functioning as the storage section of main memory 16 to which the SCU 14 is interfaced. The ACU 34 includes all the control logic for providing the interfacing action and is preferably located physically on the SCU module itself.

The interfacing of the SCU 14 to the main memory 16 is provided by means of the ACU 34 through a bi-sectional interface comprising (i) the ACU 34 and the links between the SCU 14 and the ACU 34 (collectively designated as 30A) and (ii) the link between the ACU 34 and a MMU 36 of main memory 16 (collectively designated as 30B). The following description will focus on the ACU, its links with the SCU, and its operation in providing the SCU with means through which transfer of memory commands, and associated data and address data, to and from the storage modules in the main memory may be accomplished A memory configuration for the MMU 36 which is particularly adapted for use with the efficient interfacing action of the ACU 34 will also be provided.

The SCU 14 is preferably interfaced to a main memory which has a non-bused, high bandwidth, and block oriented configuration. All CPU accesses to or from memory are made through the ACU 34 in block increments comprising a selected number of bytes (typically 64 bytes). Data storage in the main memory is provided through the use of extended hex-size modules, each preferably providing 64 megabits (M-bit) of storage using a one M-bit DRAM. Four such memory modules are grouped together to form a single MMU 36 and the main memory 16 includes at least one such MMU.

The ACU 34 provides the interface and control for the memory modules included within the MMU 36 and includes means for accepting a command/status/index signal over control line 38 from the SCU 14 indicative of the particular memory operation that is required, such as, read-from-memory, write-to-memory, etc. This signal also indicates the status of buffers within the logic portion of the SCU designated for receiving commands back from the ACU.

It should be noted that all pre-execution decoding for memory operations is accomplished by the SCU 14, and corresponding memory addresses are stored within address buffers within the SCU. More specifically, the SCU accepts memory access commands from requesting system units (such as CPUs or I/0 units), decodes the command, initiates the translation of virtual addresses to physical addresses so as to correspond to byte address in the MMU segments, identifies and prioritizes non-conflicting memory accesses which may be executed, and generates command signals for initiating the execution of memory operations by transfer of data to and from memory.

The operation of the ACU in providing the interfacing action is independent of the manner in which the pre-execution prioritizing and decoding is accomplished by the SCU. It is merely required that row/column addresses associated with memory access operations being requested by a system unit be stored in separate address registers in the control logic section of the SCU. The SCU then only needs to relay to the ACU information indicative of the particular memory port or segment that is the object of a particular memory operation; the associated row/column address can be relayed directly from the SCU to the MMU on the basis of a signal or index field from the ACU identifying the particular SCU address register to be used as the source of the row/column address. It thus becomes possible to regulate the transfer of the memory address in synchronism with the availability of memory segments being addressed. In addition, data resulting from execution of a memory operation can be directly associated with one of the address registers in the SCU on the basis of memory commands to the SCU; the need for relay of return addresses from memory to the SCU is eliminated.

In order to accomplish the above, a direct address path 42 is provided between the SCU 14 and the corresponding MMU 36 so that the row/column address designating a particular segment of memory being addressed by a memory command can be transferred directly from the SCU 14 to the corresponding MMU 36 under control of the ACU 34. The command signal relayed from the SCU on line 38 includes an index which is used by the ACU as a basis for initiating direct transfer, from the SCU, of designated ones of the stored addresses referencing desired rows or columns within addressed memory segments in the MMU 36. The ACU accepts the index accompanying a memory command over the command/status signal line 38 and relays the index back if and when the particular memory segment being referenced by the command is available to be accessed More specifically, the memory access requests prioritized by the SCU for being executed are stored within address registers provided in the SCU. The execution of the particular memory command selected by the SCU for being executed at a given time is initiated by transmission of a load command to the ACU along with an index identifying the location of the corresponding memory address in the SCU address registers. The ACU subsequently receives the index and the associated memory command information which includes a designation of the memory segment/bank to be accessed. If the ACU determines, through its links to the MMU, that the desired memory segment is indeed available the associated index is relayed back to the SCU so that the corresponding row/column address identified by the index may be transferred directly to the MMU over the row/column address path between the SCU and the MMU.

However, if the addressed memory segment is found to be busy, possibly for a variety of reasons including the cycle delay in loading and unloading DRAMs and more commonly due to the need for the memory system DRAMs to be periodically refreshed on a per segment basis, the ACU continues monitoring the segment and relays the index back to the SCU only when the address segment becomes available. In the meanwhile, the ACU, through suitable buffering, continues the processing, on a sequential basis, of other memory access commands which are logged with the SCU and require access to a memory segment which is available at the time. More specifically, as will be described below, the ACU uses a command buffer for each memory segment for accepting an incoming memory command corresponding to a segment while a current memory command related to the same segment is being executed.

When two or more memory commands arriving at the SCU are found to address the same segment in memory, they are handled sequentially in the order they are received and while a segment is being accessed on a given command it is made inaccessible to the other command requesting the same segment; the ACU accomplishes this by controlling the transmission of the index back to the SCU. The index of the unprocessed command is held back from the SCU until the ACU is in a position to process the command. In essence the ACU proceeds with execution of a memory command on a segment basis while buffering successive commands and processing them on the basis of availability or validity of addressed memory segments In this manner, the ACU can synchronize accesses to memory segments without any need to rely upon memory clocks for detecting and resolving access conflicts.

In addition, the use of the index also permits the ACU to control multiplexed signals relayed over the address lines from the SCU 14 to the MMU 36. As noted above, the ACU relays the index back to the SCU over the command/status line when it is ready to execute the associated memory command. The index relayed back to the SCU 14 identifies the stored row/column address which corresponds to a particular available segment of memory within the MMU. Receipt of the relayed index from the ACU initiates the transfer of the corresponding row/column address stored in the SCU over line 42 directly to the MMU. More specifically, the index represents a predefined bit field in the command information transferred from the SCU to the ACU, which identifies one of the plurality of address registers provided within the SCU for storing row/column addresses associated with memory commands prioritized for execution by the SCU. The index preferably has a 4-bit field so that it is capable of identifying one of up to 16 address registers.

Row/column addresses are transmitted in a multiplexed manner over the direct address path from the SCU to the MMU. Along with the index, the ACU also relays back to the SCU a signal, preferably in the form of a single bit added to the index field, which serves as a row/column select signal indicative of whether a row or column is being addressed in a memory segment by the address directly transmitted from the selected SCU address register to memory. The ACU also relays back with the index a signal, preferably a single bit signal, indicative of the particular one of the row and column addresses stored in the SCU address registers. The multiplexing of row addresses with column addresses is performed on the basis of the row/column select signal generated by the ACU by means of a standard multiplexing arrangement (not shown) provided within the SCU. For the case where the SCU is 10 provided with 12 address storage registers, the row/column select signal can be used to index up to 12 addresses, thereby making it possible to support addressability of up to 16M-bits of memory.

The index associated with a memory command preferably includes at least one designated code bit for identifying the system CPU or an I/0 unit originating the memory operation being executed; this facilitates prioritizing of memory commands and helps routing of accessed data appropriately through the ACU and SCU to the system unit originating the command. In addition, such an arrangement allows memory commands to be executed according to different predefined procedures depending on whether requesting unit is a system CPU or an I/0 unit. For instance, it may be desirable to restrict write operation by a CPU to a selected number of quad-words, typically eight quad-words at one time while allowing I/0 units to write anywhere from one byte up to number of bytes permitted for CPU writes.

The ACU 34 is also linked to the SCU 14 through a communication line 40 through which a command/status signal is relayed to the SCU for providing an indication of availability and status of data requested from memory by the SCU. Data communication lines 44 and 46 serve as means for transfer of data between the SCU and the ACU. It should be noted that the ACU 34 does not serve as a means for storing data for subsequent transfer to or from the SCU; instead, the ACU merely functions as a means for relaying data on-the-fly from addressed portions of memory modules within the MMU to the SCU or vice versa. The modular composition of the ACU and its operation in providing the above function will be described in detail below.

On the memory end of the memory sub-system 32, the ACU is linked to the MMU 36 by means of communication line 48 for transfer of control/command signals from the ACU indicative of the particular memory operation desired by the SCU. Communication line 50 serves as a means for transfer of the status of requested data from the MMU to the ACU. Data communication lines 52, 54 are provided as means a for transfer of data between the ACU and the MMU.

As also seen in FIG. 2 the ACU 34 is linked to the SPU 22 through a control line 56. This link serves as a means for adapting the ACU, and hence the interfacing action provided by it, to the various timing modes between which the main memory may be switched. More specifically, the SPU 22 is linked to the main memory via control line 58 and status line 60 in order to initialize the memory and switch the memory between three different timing modes: (1) a normal mode for supporting regular system operation; (2) a step mode to support single-step operation on the basis of system clocks; and (3) a stand-by mode for retaining system integrity during power failure and scan operation. The switching action is performed by the SPU 22 in responses to the transfer of appropriate signals from the SCU 14 via control lines 62 and 64. The communication link provided by line 56 between the ACU and the SPU permits the operation of the SCU-ACU interface for the SCU to be consistent with the memory mode in operation at a given time.

Clocking for operating the interface to access memory is conveniently provided through clock means 66 provided on the SCU. The clock means 66 is preferably a programmable clock capable of generating a plurality of time-staggered clock signals having preselected clock periods. Such clocks are conventional and available in the form of I.C.s typically generating up to eight clock signals with different time periods. Different ones of the clock signals may be selected to control memory access on the basis of the clock period best suited for optimal data transfer timing as well as the mode under which the system is operating at a given time.

While FIG. 2 shows the interface between the SCU and the main memory as comprising a single memory sub-system 32 which includes a single MMU 36 and a corresponding ACU 34, it will be understood that additional MMU--ACU pairs or memory sub-systems may be used to permit the system CPUs to share increased memory. In the preferred embodiment for using the SCU-ACU interface means of this invention to advantage, each MMU 36 of the main memory 16 is split between two memory ports on the SCU with each port having two segments and all segments being interleaved on block boundaries. The SCU can then be used to cycle all four segments in parallel through use of a single memory sub-system thereby permitting up to four memory references to be operated upon in a parallel fashion; in such a case, the ACU allows the SCU 14 to accept a memory request from any of the CPUs and too pass it on to the designated segment in memory. The interleaving of segments is based on matching the memory access block size to the size of the cache blocks used in the system CPUs.

Figure 2A:
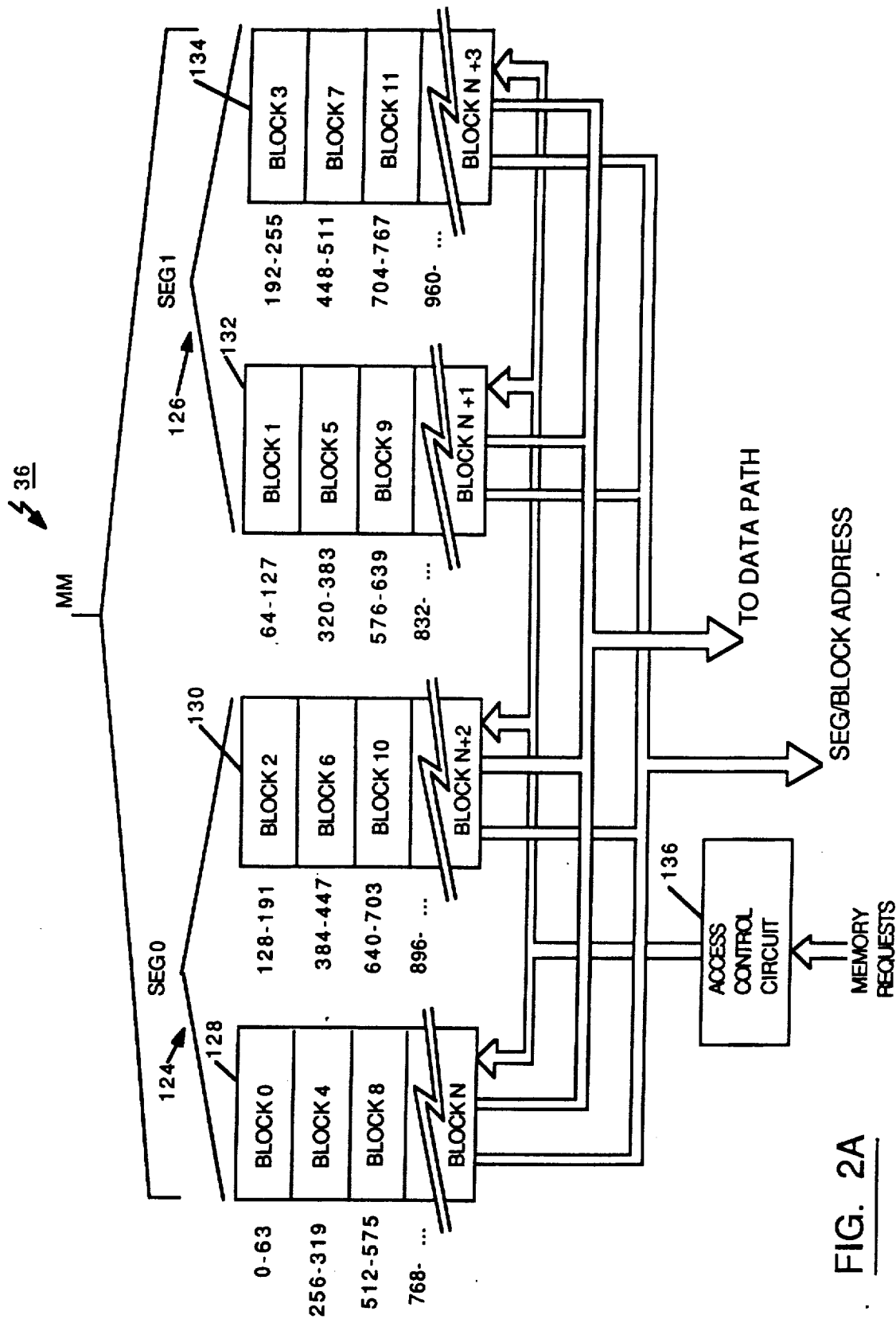
FIG. 2A is a block diagram of a preferred memory organization showing interleaving of memory segments on block boundaries.

A preferred segment-based organization for each MMU forming the main memory is illustrated at FIG. 2A. As shown therein, the data storage section of each MMU 36 comprises a pair of segments 24, 126 each of which comprises a pair of memory banks. The four memory banks are respectively designated as 128, 130, 132, and 134. The memory banks are DRAM-based and may each store, for example, up to 64 Megabytes of data. Although the general organization of such a segment-based memory is conventional, it is important that the memory addresses for the memory banks be interleaved on block boundaries. Such an arrangement is illustrated at FIG. 2A wherein interleaving is shown for a preferred data block size of 64 bytes. A first block (BLOCK O) has byte addresses 0–63 associated with it and is stored in the first bank 128 of the first memory segment 124; the next consecutive block comprising byte addresses 64–127, i.e., the second block (BLOCK 1), is stored in the first memory bank 132 of the second memory segment 126; the third block (BLOCK 2) having byte addresses 128–191 associated with it is stored in the second memory bank 130 of the first memory segment 124; the fourth memory block (BLOCK 3) has byte addresses 192–225 associated with it and is stored in the second memory block 134 of the second memory segment 126; the fifth block (BLOCK 4) has byte addresses of 256–319 associated with it and is stored inn the first memory bank 128 of the first memory segment 124; and so on.

In addition, the main memory 36 comprises of the plurality of memory modules is provided with an access control circuit 136 which permits independent and simultaneous access to a plurality of the memory banks for obtaining blocks of data spread over different ranges of byte addresses. The choice of the data block size on which interleaving of memory segments is based is matched to the size of the chache blocks used in the various CPU's comprising the multi-processor system to maintain a correspondence between data blocks requested by a CPU and the corresponding interleaved data blocks available from the segments of each MMU.

Figure 3:
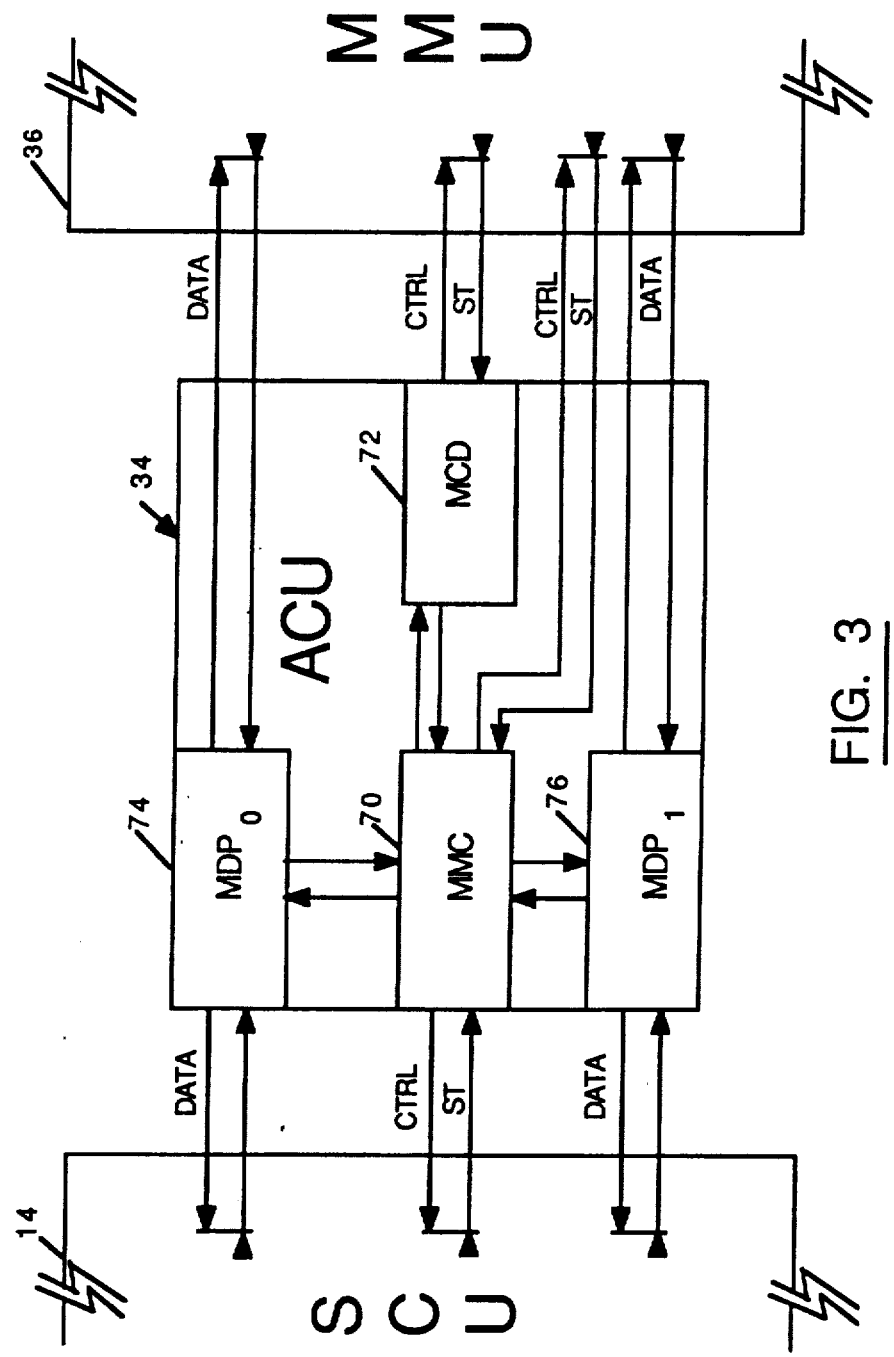
FIG. 3 is breakdown of the modular composition of the array control unit (ACU) which provides the interfacing action between the SCU and system memory.

Turning now to FIG. 3, there is presented a block diagram of the physical breakdown of components within the ACU. The ACU logic is implemented in macro-cell arrays and essentially provides the data path and control for the memory system. The ACU includes a main memory control (MMC) module 70 which in combination with the memory control DRAM (MCD) module 72 provides control for the data path and the memory modules. For providing this control operation, the MMC 70 and MCD 72 are linked to each other for exchange of command signals and to the MMU 36 through control/status lines. The MMC 70 is in direct communication with SCU 14 by virtue of similar control/status lines.

Figure 4B:
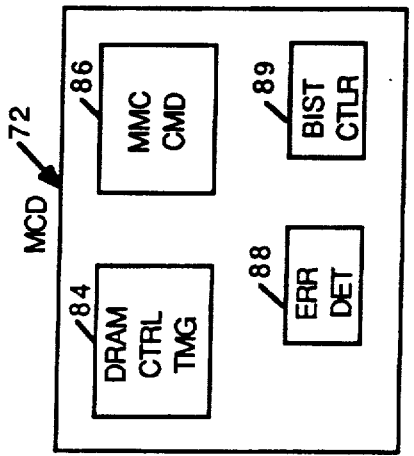
FIG. 4B is a block diagram illustrating a memory control DRAM (MCD) module that is used within the ACU module.
Figure 4C:
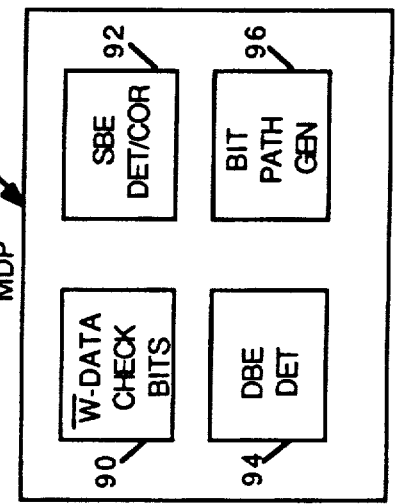
FIG. 4C is a block diagram illustrating a memory data path (MDP) module that is used within the ACU module.
Figure 4A:
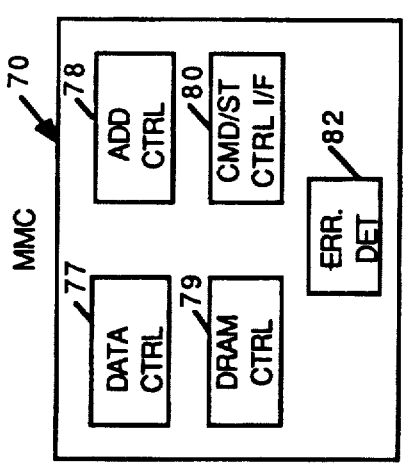
FIG. 4A is a block diagram illustrating a main memory control (MMC) module that is used within the ACU module.

Referring to FIG. 4A, the MMC 70 is a gate array module including data control means 77 for generation of control signals for the data path, address control means 78 for generation of control signals for the address path, DRAM control means 79 for generation of DRAM control commands to the MCD (72 in FIG. 3), means 80 for provision of the command, control and status interface to the logic portion of the SCU, and error detection means 82 for provision of error detection for all control lines of the MMC.

The MCD 72 is a gate array which includes controller means for the DRAMs included therein and for self-test functions. More particularly, as seen in FIG. 4B, the MCD 72 includes means 84 for generation of control timing for the DRAMs, means 86 for generation of commands to the MMC during normal operation, and to the MMU when the system is under step-mode operation, means 88 for provision of error detection on control lines for the MCD, and controller means 89 for regulating self-test operation, as will be described in detail below.

The data path section of the ACU 34 is divided between two memory data path modules (MDP,s) 74 and 76 (see FIG. 3. The MDP modules are linked to the MMC 70 for accepting and acknowledging command signals, and ported to both the SCU 14 and the MMU 36 through appropriate data lines for transfer of data between the SCU and memory. Moreover, each MDP module provides data transfer over an independent or alternative path.

As shown in FIG. 4C, each MDP 74,76 includes means 90 for provision of check bit generation for write data, means 92 for detection and correction of single bit errors (SBE) on read data, means 94 for detection of double bit errors (DBE) on read data, and means 96 for provision of byte merge paths for received data.

It will be understood from the above that the system memory is interfaced to the control logic in the SCU at three distinct junctions as below:

1) all command and status information is handled through the MMC module provided on the ACU;

2) all data transfers are handled through the pair of MDP modules, also provided on the ACU and ported into the SCU; and 3) information representing row and column addresses is relayed by the SCU to the corresponding MM segment upon initiation by the ACU.

Figure 5:
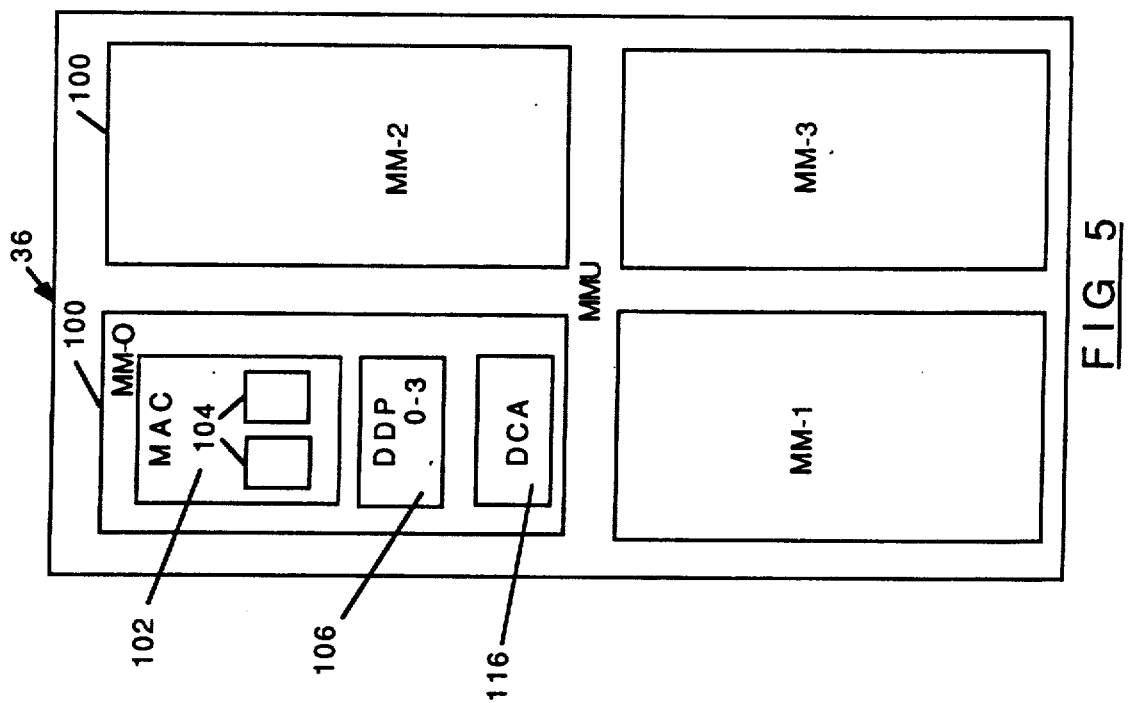
FIG. 5 is a schematic diagram illustrating the modular composition of a main memory unit (MMU) for use with the ACU of FIGS. 3 and 4 in providing the interface between the SCU and memory.

Turning now to FIG. 5, there is shown a schematic diagram of the modular composition of the main memory unit (MMU) 36 which forms part of the system main memory to which the SCU is interfaced. As noted above, each MMU is preferably comprised of four memory modules (MMs) 100 providing four memory banks (128, 130, 132 and 134 in FIG. 2A). It should be understood that while the ACU 34 serves as the primary means through which the SCU interacts with the system memory through a particular MMU, the operation of the ACU is not restricted to a specific configuration of the MMU. In terms of storage allocation, the MMU is preferably divided into two memory segments, each having two banks as described above. The MMU contains all DRAMs associated with a single memory sub-system and the DRAMs are logically spread across the four MMs 100 so that a single data path is supported between the MMU and the ACU. The two segments of the MMU thus share a common data path even though the segments are operated independently. The two banks comprising each MMU segment are controlled by the ACU so that only one bank may be active for a given memory command. This is accomplished by making the address lines to the segments different while retaining common data lines. More specifically, the write enable and column address select signals are common to both segments while the status (asserted or negated) of the row address select signals is different and determines which of the two segments is rendered active.

According to a preferred logic implementation, each memory module (MM) is made up of a main array card (MAC) module 102 with added storage capacity being provided by a pair of "daughter array card" (DAC) modules 104 capable of being plugged into the MAC. Each MAC is an extended hex module that contains surface mounted DRAMs and related logic. In particular, the MAC includes means for providing the following functions in addition to the storage capacity provided by the DRAMs: (1) provision of write data buffering; (2) provision of read data buffering; (3) insuring integrity of DRAM data during power failure; (4) provision of connections and logic support for the two DAC; and (5) control of memory cycles during step-mode operation.

Figure 6A:
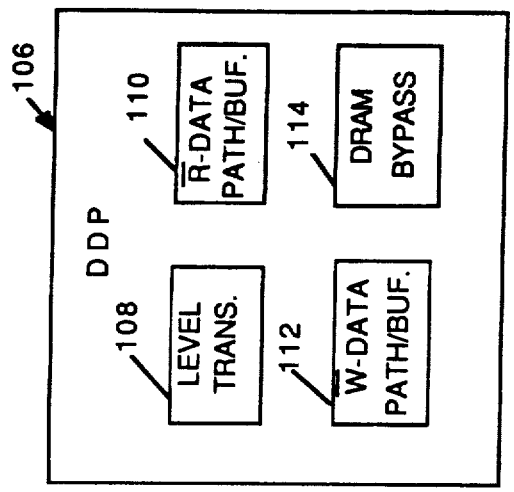
FIG. 6A is a block diagram of a DRAM data path (DDP) module of the kind used in memory modules of the main memory unit (MMU)

Each memory module 100 has four DRAM data path (DDP) modules 106 located on it. As seen in FIG. 6A, each DDP has provided on it means 108 for handling level translation between the logic levels (ECL to TTL and vice versa) used in the module, means 110 for provision of the read data path and related buffering, means 112 for provision of the write data path and related buffering, and means 114 for provision of a DRAM by-pass path when required.

Figure 6B:
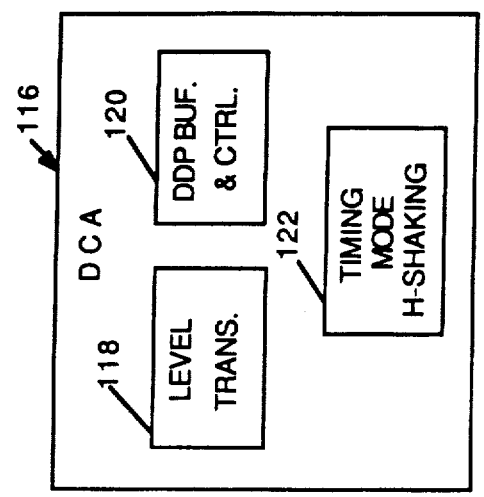
FIG. 6B is a block diagram of a DRAM control and address (DCA) module used in the memory modules of the main memory unit (MMU)

Each memory module 100 also has a DRAM control and address (DCA) module 116 which, as seen in FIG. 6B, includes means 118 for providing level translation, means 120 for providing buffering and control signals to the DDP modules 106 including memory commands which are discussed in detail below, and means 122 for execution of handshake sequences when switching between different system timing modes under control of the SPU 22 (of FIG. 2).

Turning now to the operation of the interface according to the invention, the overall interfacing action provided by the ACU 34 can be divided into four distinct segments:

1) the SCU to memory command;
2) the DRAM address action;
3) the memory to SCU command; and
4) the data movement action.

In the case of write-to-memory operations, all four segments are applicable whereas read-from-memory operations do not involve segment three since there is no need for relay of commands from the memory to the SCU.

Communication between the SCU 14, and more particularly, the control logic portion of the SCU, which is also referred to herein as the SCU for the sake of convenience, is accomplished through the transfer of memory commands from the SCU to the particular MMC 70 located within the ACU 34 that is linked to the segment of memory that needs to be accessed. This action is performed by the use of segment command buffers (180 and 181 in FIG. 10) which are located within each MMC and which correspond to the memory segments controlled by the MMC.

Upon receiving a memory command from the SCU, the ACU loads the command into the appropriate command buffer. Designated bits are used to indicate, inter alia, the segment or bank of memory that is being addressed, the particular memory operation to be performed, the length of the memory word being transferred, the type of parity being used and its validity with respect to the clock cycle, the availability of the command buffers and hence the ACU to accept memory commands from the SCU, the availability of the command buffers to accept requested data from memory for transfer to the SCU, cancellation of a specified memory command, the index to be relayed back to the SCU for use in specifying the memory address to be transferred directly to the MMU, and initiation of command loading into the buffers. A listing of typical command bit designations (and corresponding descriptions) for use in regulating the action of the segment command buffers is set forth below as Table A.

TABLE A

| # Bits | Name | Description |
|---|---|---|
| 1 | CTLPAR | specifies odd parity across all bits; valid on every clock cycle |
| 2 | BANKADDR | designates one of two segment banks and selection of command buffer |
| 2 | CMD | specifies memory operation to be performed |
| 4 | INDEX | designates index used to specify an SCU address |
| 1 | LDCMD | indicates validity of loaded bits |
| 1 | BUFAVAIL | specifies that SCU can accept commands |
| 1 | SENDDATA | specifies that memory can transmit read data |
| 2 | CYCLESTAT | specifies whether a request should be cancelled |
| 2 | LENGTH | defines number of quadwords being transferred. The bits in the length field in Table A are decoded as follows: |

| I/O LENGTH FIELD | TRANSFER LENGTH (Quad-words) |
|---|---|

TABLE A-continued

| # Bits | Name | Description |
|---|---|---|
| | | 0 0     4 |
| | | 0 1     8 |
| | | 1 0     1 |
| | | 1 1     2 |

When the MMC receives a command as indicated by the LDCMD bit, the command is loaded into the appropriate segment command buffer by decoding the most significant bit (MSB) of the BANKADR bits designating the particular bank of memory to be accessed. When the MMC is ready to accept another command a BUFAVAIL signal is asserted for a clock cycle indicating the availability of the segment command buffers for accepting MMC commands.

The CYCLESTAT bits permit a request to be cancelled when a read cycle is being executed. In such a case the MCD (72 in FIG. 3) completes the DRAM cycle timing to avoid occurrence of problems resulting from the cycle being cutoff. The CYCLESTAT bits are ignored during write cycles.

Considering the action of the ACU in serving as a communication link between the memory and the SCU, it should be noted that there are four specific conditions under which the ACU allows the memory to communicate with the SCU: (1) when a read request was made and the data are ready to be sent; (2) when an error is detected during the transfer of read data; (3) when an error is detected during the transfer of write data; and (4) when a command buffer is available. When a memory command is accepted by the ACU, it is loaded into the appropriate command buffer, decoded on the basis of the bit designations and acted upon as required. A command from memory, for instance, is relayed through the ACU command buffers to the SCU and the accompanying data are transferred through the ACU upon receipt of the SENDDATA signal indicating that the SCU is ready to receive data which was either requested by and is available for transfer from memory.

Specific command designations are used by the ACU to indicate to the SCU the status of data transfer as well as to regulate instantaneous flow of data corresponding to a memory command being processed. More specifically, designated bits relayed from the ACU to SCU are used to indicate existence of data errors, the need for read data to be returned, the corresponding memory segment, the availability of segment command buffers and the initiation of loading thereto, the indication of error-free completion of read-data and write-data operations, and the parity status on data relayed to the SCU. A listing of typical command bit designations forming part of an 8-bit information word generated by the MMC within the ACU and used to relay information from memory through the ACU to the SCU is given below as Table B.

TABLE B

| # Bits | Name | Description |
|---|---|---|
| 1 | CMD | specifies return of read data if = 0; specifies error data if = 1 |
| 1 | SEGMENT | designates memory segment number |
| 1 | LDCMD | specifies a load command and segment for the SCU |
| 2 | BUFAVAIL | indicates availability of each command buffer |
| 1 | WRITEOK | implies transfer of data to |

TABLE B-continued

| # Bits | Name | Description |
|---|---|---|
| | | memory from the SCU without a parity error |
| 1 | READOK | implies that no ECC errors occurred during transfer of read data through the MDP in the ACU |
| 1 | CTLPAR | indicates odd parity across all bits; valid on every clock cycle |

The ACU regulates data movement between the SCU and the memory in such a manner that a fixed number of cycles is provided between the receipt of a data transfer command at the SCU and the point when corresponding data gets to a data switch in the SCU control logic for being transferred over to the memory through the ACU.

When the ACU is ready to accept data from the SCU pursuant to a valid command for subsequent transfer of the data to memory, the ACU relays the availability of the segment command buffers to the SCU and awaits receipt of a SENDDATA signal from the SCU. However, the SCU is not at this point in time in a position to transmit the SENDDATA signal because the device or CPU requesting the memory command also has to be notified of the SENDDATA signal in order for the corresponding memory transfer to occur, and the transfer of signals through the interconnect between the SCU and the requesting CPU requires at least one system cycle in either direction. This delay is accommodated by the provision of a data delay signal from the SCU to the ACU and more particularly to the MMC module (70 in FIG. 3) located therein.

Figure 7:
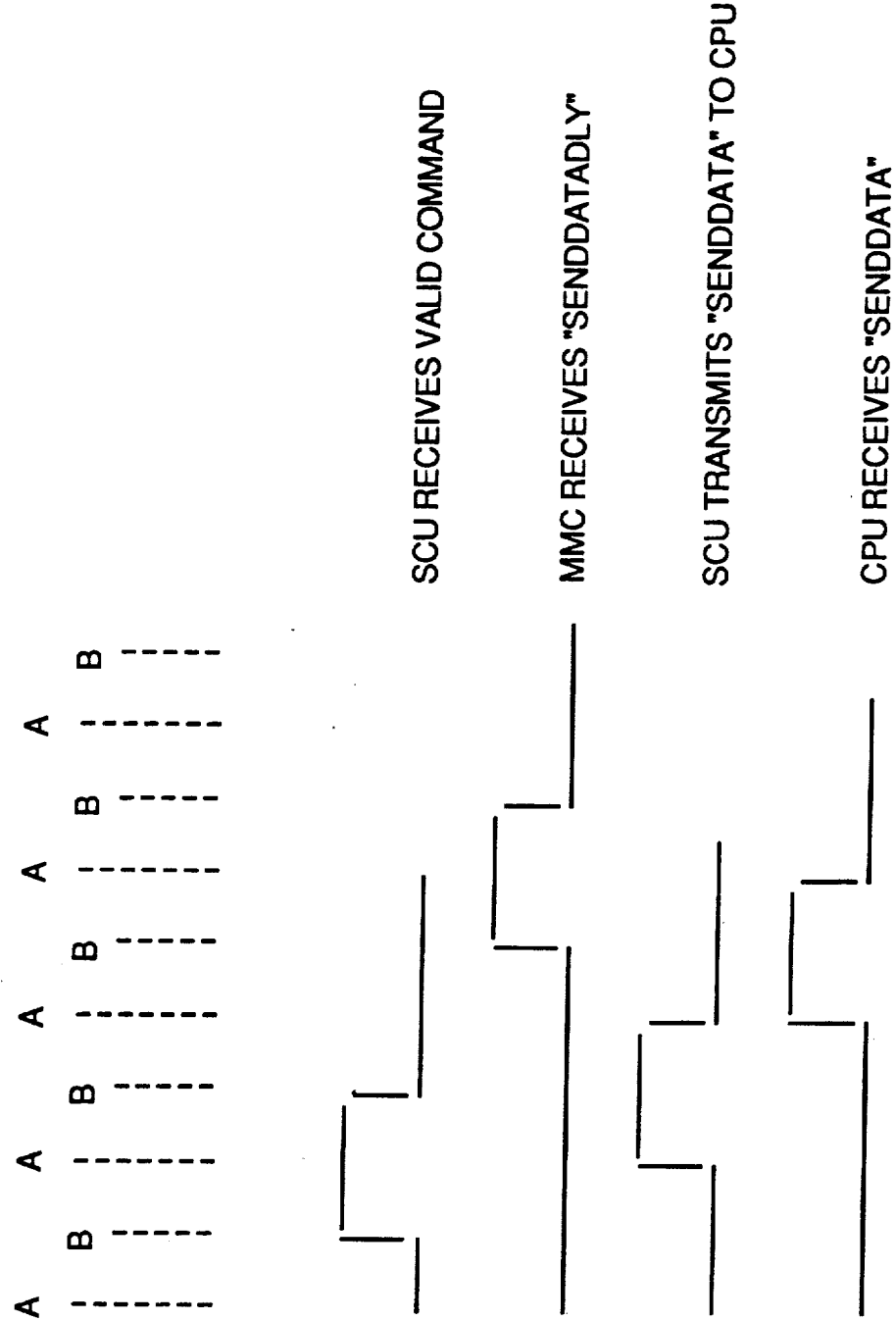
FIG. 7 is a timing diagram showing the relative disposition of the data transfer signals between the SCU and the ACU.

The timing relationship between memory commands and the movement of data between the SCU and the memory will be apparent by referring to FIG. 7 which is a timing diagram illustrating the relative disposition of data transfer commands and the corresponding movement of data between the SCU and the ACU. As seen therein, the dashed vertical lines referenced with alternating letters A and B represent successive system clock cycles. After a valid command is received at the SCU, a data delay signal SENDDATADLY is transmitted from the SCU to the MMC and serves as a basis for accommodating the delay that occurs due to the time required for signals to traverse the interconnect (typically a data cable) between the SCU and the particular CPU involved in a memory operation. More specifically, the SCU transmits the SENDDATADLY to the MMC delayed by one cycle to take into account the cycle delay taken for the SENDDATA signal to reach the CPU. The MMC further delays the SENDDATADLY received from the SCU by another cycle to account for the single-cycle delay required for data to be transferred from the CPU to the SCU prior to its being transmitted to the corresponding segment in main memory.

Considering now the address interface, the MMC preferably receives the starting quad-word (an eight-byte word) data information from the SCU at the same time it receives the command information. This information includes bit designations specifying the address of the first eight bytes of memory being accessed for data transfer, the parity status on the address designation bits, and the parity status on all the address bits. Typical bit designations for the address command information provided to the MMC are listed below as Table C.

TABLE C

| # Bits | Name | Description |
|---|---|---|
| 3 | STADDR | specifies starting quad-word address |
| 1 | STADDRPAR | designates odd parity on address bits |
| 1 | ADDRPAR | indicates parity on address bits |

It should be noted that the DRAM row and column addresses corresponding to memory operations that need to be performed by the ACU are stored within the SCU. The MMC provides the control signals to the SCU for transmitting the appropriate row or column address at proper time within the DRAM cycle. This is accomplished by the use of bit designated signals indicating the index to be used by the SCU for specifying the row/column address to be transferred to memory, the selection of either a row or column on the basis of the row/column address, and the parity status on the signals. Typical bit designations for signals used for this purpose are listed below as Table D.

TABLE D

| # Bits | Name | Description |
|---|---|---|
| 4 | INDEX | specifies the index to be loaded into the segment command buffer |
| 1 | COLADDRSEL | designates a row or column address |
| 1 | INDEXPAR | indicates odd parity on loaded bits |

Summarizing the interfacing operation of the ACU 34 (see FIG. 3), memory command information put out by a requesting system unit is received from the SCU 14 by the MMC 70 in the ACU where the information is decoded and the appropriate DRAM commands passed to the MCD 72. The MMC 70 provides control over the entire data path while the MCD 72 provides all the control timing for the DRAMs. As write operations are performed, data enters the two MDP modules 74 and 76. Each MDP then operates upon a long-word providing error-correcting code (ECC) check bits on the write data. Data are subsequently passed on to the MMU (36 in FIG. 2) where they are stored in one of the write buffers included therein. When read operations are being performed, data are received by the MDPs 74 and 76 from the MMU 36. Each MDP then decodes the check bits provided with the data and subsequently corrects single bit errors and detects double bit errors before transferring the data on to the SCU 14. From the SCU, the transferred data are passed on to the system unit originating the memory command.

All data buffering needed for memory operations is contained within the MMU 36. According to a preferred embodiment, the MMU stores 128 bytes of write data into 64-byte write buffers and one to eight bytes of read data into 64-byte read buffers. When write operations are being performed, data passes through the MDP modules and is stored within the MMU 30. Once this transfer is complete, data can be written to the DRAMs provided withinn the MMU. When read operations are being performed, a block of data are read into the MMU read buffer and the entire data are shifted out, preferably eight bytes at a time, through the MDPs until the entire block of read data has been transferred.

As noted above, all memory address decoding is provided by the SCU and for every command sent to the MMC the accompanying index is relayed back to the SCU by the MMC along with a row/column select bit if and when the requested memory segment is available. This relayed index is then used to select the appropriate row/column address which is then applied directly to the MMU over the row/column address line 42 (FIG. 2).

A more detailed description of the modular composition and related operation of the ACU (of FIGS. 3 and 4) and an illustrative memory configuration for the MMU (of FIGS. 5 and 6) is provided below with reference to the interfacing action involved in executing typical read-from-memory and write-to-memory operations In addition certain specialized operations, including the read-modify-write, the write-read and the write-pass operations, which allow efficient utilization of memory resources will also be described.

Figure 8:
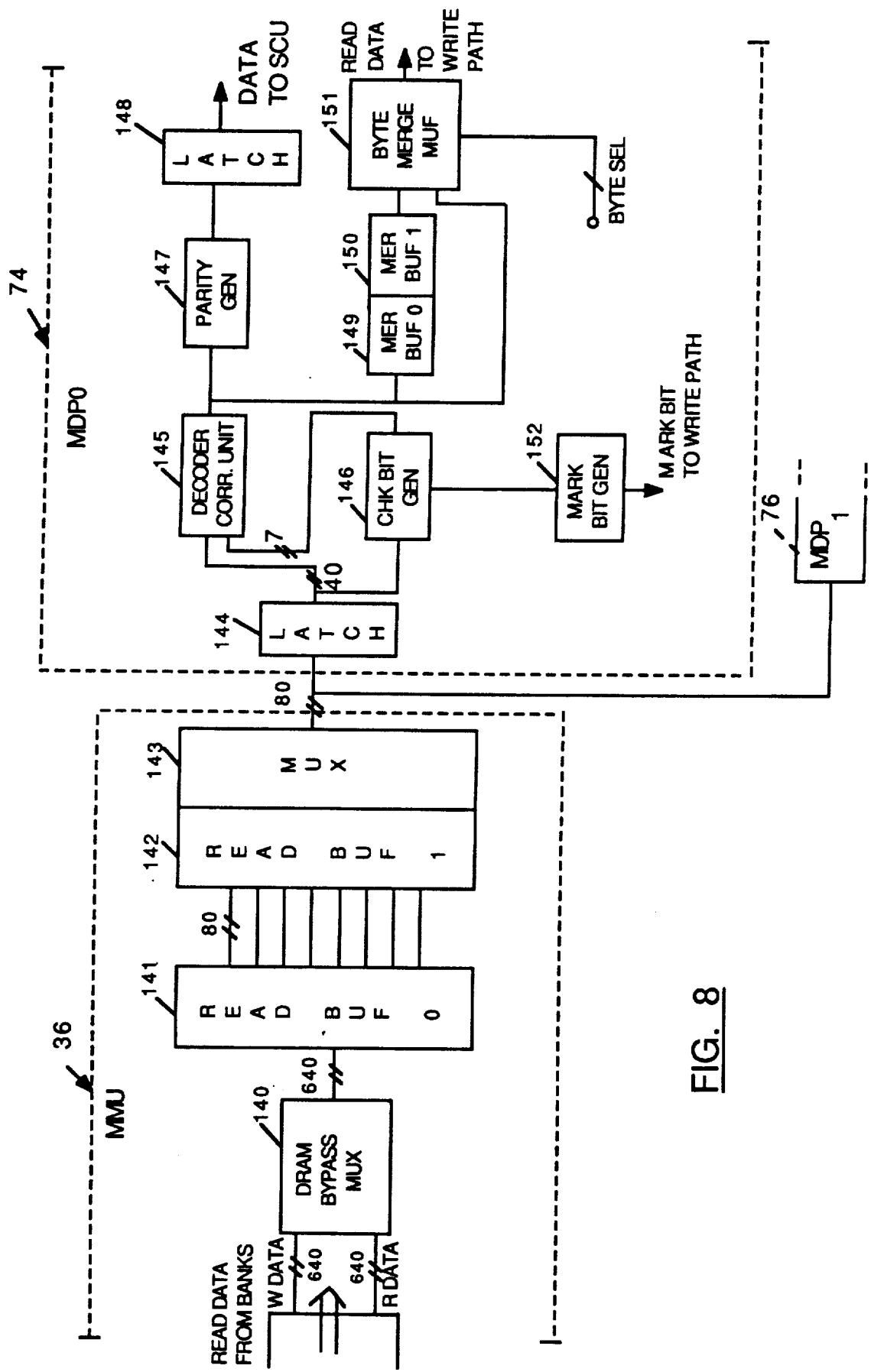
FIG. 8 is a block diagram illustrating in detail the modular composition and operation of the MMU and the MDP modules in providing the read path for memory operations.

Referring in particular to FIG. 8, there is shown a more detailed breakdown of the MMU 36 and the MDP 74 of the ACU clearly illustrating the data path involved in performing a read operation between the SCU and the MMU. The preferred width of the data path in terms of the number of bits is indicated at various places where the data lines are intersected by a double-slash (//) symbol. As noted above, all memory operations are in 64-byte quantities. When a read data operation executes, one bank i.e., 640 DRAMs, of memory from a designated memory segment within the MMU are read and loaded through a DRAM bypass MUX 140 into a first read buffer 141. Data in read buffer 141 is subsequently transferred to a record read buffer 142, preferably in 80 bit segments, so that a second read operation from the other segment may continue immediately. Data from read buffer 141 is fed into a 8:1 multiplexer 143 for wrapping data out at 80 bits per clock cycle. The first 80-bit word to be transferred is determined by the "starting quad-word" field in the command buffer of the MMU. The number of subsequent 80-bit words to be transferred are determined by the "number of quad-words" field in the command buffer.

The 80-bit data word put out by the memory module is split and transferred to the two MDP modules 70 (see FIGS. 3 and 4) residing within the ACU. Each MDP then operates on 40 bits by performing double-bit error correction and detection, and single-bit error correction as necessary, preferably on the basis of some form of modified Hamming code.

The operation and composition of the first single MDP 74 is described below and also applies to the second MDP 76. More specifically, as shown for the first MDP 74, 40 bits of the 80-bit data word transferred from the MMU read buffer 141 are latched into a latch 70 and then transferred over into a syndrome decoder and data correction unit 145. The output of latch 144 is also used to generate a check bit through check bit generator 146 the output of which is combined in the syndrome decode unit 145 and used to ascertain data validity and make appropriate corrections or provide error signals as necessary. The corrected data are subsequently acted upon by a parity generator 147 and the resultant data are latched into latch 148 from where it can be transmitted over to the SCU (14 in FIG. 3). Once the read operation is completed, the MMC (70 in FIG. 3) updates the "available status" indication in its respective segment command buffer (180 in FIG. 10) to indicate that further memory operations may be proceeded with.

The output of the syndrome decoder and correction unit 145 is also provided to a pair of serially linked I/0 merge buffers 149 and 150 from where the buffered data are transferred to a byte merge multiplexer 151. The MUX 151 also accepts the corrected data directly from the decoder/correction unit 145 and uses a byte select signal applied directly to the MUX 151 as an index to generate read data to be relayed to the write path. A mark bit generator 152 is provided to accept the output of the check bit generator 146 and generate a single mark bit therefrom. The mark bit is available for ascertaining data integrity in the write path, which will be described in detail below.

It should be noted that in the above operation, the MMC and MCD modules decode the command information and the index and strobe the address directly from the SCU into the MMU. DRAM cycling is performed through the DCA module 116 (FIG. 6B) in order to load or unload data to and from the DRAM banks which form part of a given segment of memory. The latching of data from the DRAMs into the MMU read buffer 141 (FIG. 8) and transfer of data into the read buffer 142 is performed under the control of the MMC and MDC modules When this data transfer is complete, a "read ready" command is transmitted to the SCU and transfer of quad-words to the MDPs located in the ACU is initiated after receiving a corresponding "SENDDATA" command from the SCU over the command lines linking the SCU to the ACU.

Figure 9:
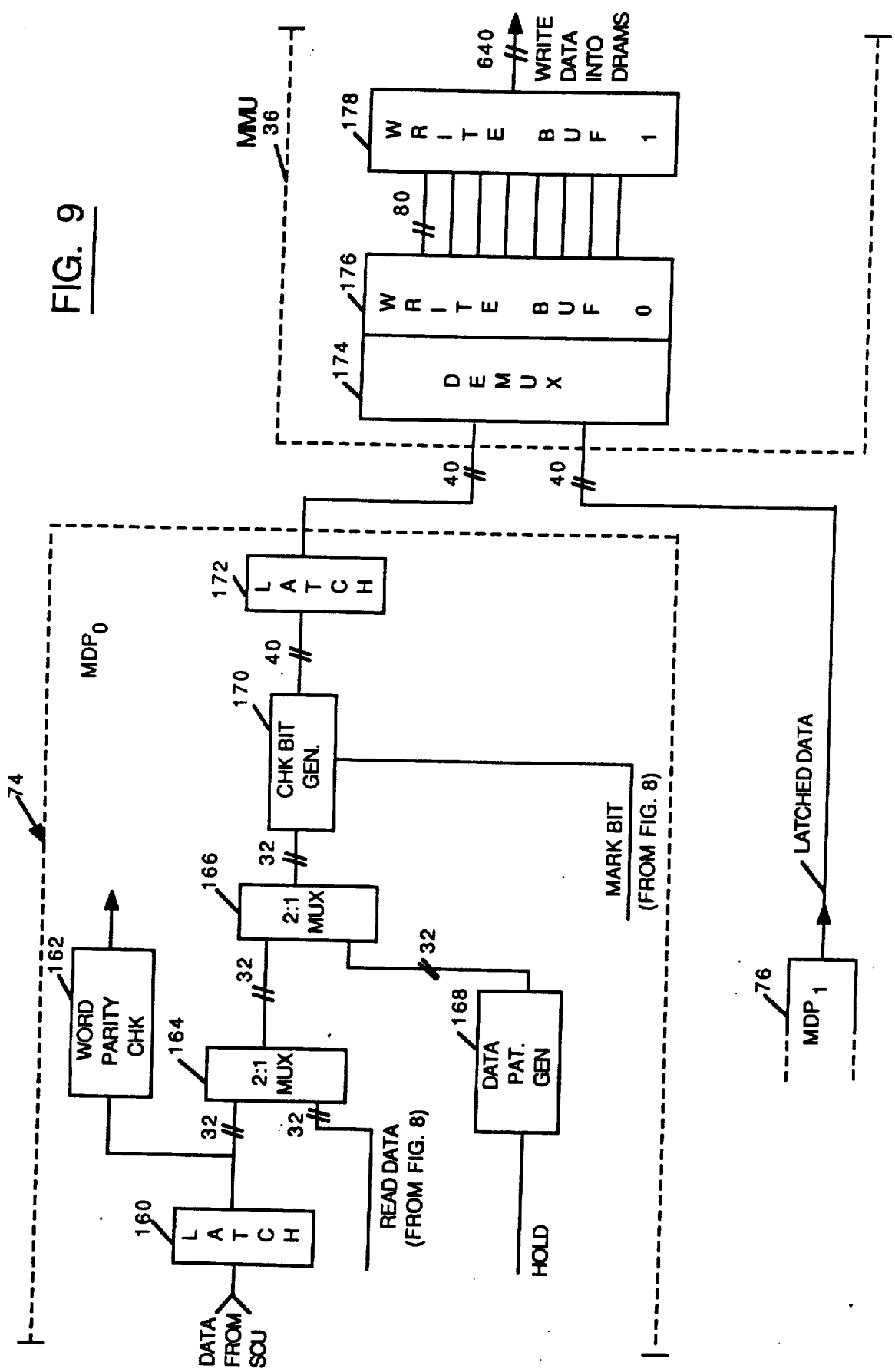
FIG. 9 is a block diagram illustrating the provision of the write path for memory operations by the MMU and the MDP modules.

Turning now to FIG. 9, there is shown a block diagram of the ACU/MMU logic blocks involved in processing a write data operation As with the read data operation, the write data sequence is initiated by the transfer of appropriate command information from the SCU to the selected segment command buffer in the MMC. In transfer of data from the SCU to the memory sub-system, the MMC and MCD modules decode the command information and the index in order to determine whether the particular memory operation involved was requested by a CPU or an I/0 device. In addition, the bank select information is decoded and the address from the SCU strobed into the selected segment for initiating the DRAM cycle timing.

As shown in FIG. 9, data are received into each MDP through a latch 160 and long-word (a 4-byte word) parity is checked on each quad-word transferred by means of a word parity check module 162 and an appropriate error signal is generated if the test is positive. Otherwise, the latched long-word data from the SCU are fed to a 2:1 MUX 164 which also receives a long-word input comprising read data (from the read data path of FIG. 8). The output of MUX 164 is a long-word which is multiplexed in a 2:1 MUX 166 receiving a long-word input from a data pattern generator 168. A check bit generator module 170 accepts the data fed to it from the MUX 166 and generates a selected number of check bits, preferably seven, for each long-word on the basis of a modified Hamming code. This output is combined with the bit generated by the mark bit generator 152 of FIG. 8 to produce a 40-bit output. The output is fed to a latch 172 from where the 40 bits of data are available for being transferred to the corresponding MMU 36 in memory.

The modular logic and operation described above with respect to the first MDP 74 also applies to the second MDP 76 which also receives the long-word data from the SCU and generates 40-bits of latched data. These data are combined with the data output of the first MDP 76 and the resulting 80-bits of data are fed to the MMU 36. More specifically, the data are fed through a 1:8 demultiplexer 174 and stored in an associated first write buffer 176 under the control of the MMC (70 in FIG. 3) and the DCA modules (116 FIG. 5) as described above. The demultiplexed and buffered data are subsequently transferred over to a second write buffer 178 in 80-bit segments so that successive blocks of data may be transferred from the SCU to the MMU with minimum idle time.

From the write buffer 178, the data are transferred over to the selected DRAM banks within a designated memory segment. At the end of the write data operation, the MMU updates the data and segment command buffer status for the benefit of the SCU.

The read data path of FIG. 8 and the write data path of FIG. 9 are linked to facilitate a "read-modify-write operation." When a write command to the memory sub-system requires a byte write (i.e., a partial long-word) it is essential that the MMC (70 in FIG. 3) first read the complete block from memory to get sufficient data for generation of check bits. This is because generation of check bits for write data is performed on the basis of a fixed number of bytes defining a block of data, preferably four bytes. When less than the minimum number of bytes, here four bytes, of data is being written to memory, data are stored in memory locations sequentially adjacent to the particular addressed memory location is first read into the write path and merged with the subject data to be written in order to make up the minimum number of bytes needed for check bit generation. Required check bits are then generated on the basis of the merged data before the complete block of data including the data read from memory and the data to be written is written into memory. Integrity of data is maintained on the basis of the check bits generated for the merged data.

In the diagram of FIG. 8, read data for the merge operation described above are obtained from memory through the byte merge path provided by the merge buffers 149, 150 and the byte merge MUX 151 from where the data are fed to the write path MUX 164 (FIG. 9) for being merged prior to check bit generation for subsequently being written to memory. This type of a request can be generated by a I/O write which can be a byte write. During the initial stages of the read operation, the I/O write data are transferred through the first write buffer 176 (see FIG. 9), the second write buffer 178 through the DRAM bypass path defined by the DRAM bypass multiplexer 140 of FIG. 8 into the first read buffer 141, and finally the second read buffer 142. One or two quad-words are subsequently transferred from read buffer 142 through the wrap multiplexer 143 into the corresponding MDP for byte merging with I/O write data through merge buffers 149, 150 and byte merge multiplexer 151. In essence, the I/O write data bytes are combined with the needed read data bytes so that new check bits can be generated. Following check bit generation the available data are ready to be loaded into the MMU 36.

The read-modify-write operation sequence is initiated by the transfer of command information from the control logic in the SCU (14 in FIG. 3) to the respective segment command buffer (180, 181 in FIG. 10) in the MMC. MMC and MCD modules in combination subsequently decode the command information (i.e. the write command), information regarding the particular bank (0 or 1) of DRAMs to be selected, and strobe the designated address into the MMU beginning with the row address and ending with the column address. In addition, status bits from the SCU are received and decoded and the DRAM read cycle timing is initiated. Under the control of the MMC, the MDP then passes the I/0 write data through to the MMU. Subsequently, under the combined control of the MMC and the MCD modules, the I/0 write data are received at write buffers 176, 178 (FIG. 9) through the associated 1:8 DEMUX 176. The data are then moved through the DRAM bypass both to read buffers 141, 143. The data are subsequently transferred through the MUX 143 to the corresponding MDP for byte merging.

Under the control of the MMC, the respective MDP receives the write data from the MMU, checks for errors and makes corrections if necessary or generates appropriate error signals, and merges the read data bytes with the I/0 write data byte in the I/0 merge buffers (159, 150 in FIG. 8) to generate a valid long-word. The MDP also generates seven check bits for each long-word and sets the mark bit and finally transfers one or two quad-words of data to the MMU as required by the SCU command signal. Additional error-indication bits such as a "mark" bit for double-bit error detection on stored data containing detected double-bit errors even when additional single-bit errors subsequently occur, may also be used.

A single data quad-word is received per clock cycle by the MMU and each such quad-word is loaded into write buffers (176, 178 in FIG. 9) through the associated DEMUX 174. All valid long-words of write data are subsequently loaded into the DRAMs on the basis of appropriate DRAM timing. The MMC and MCD modules complete the DRAM timing sequence and finally update the status of the data and segment command buffers (180, 181) for the SCU.

Another mixed mode memory operation is referred to as the "write-read data operation". In this operation data are first written to a location and then read out from the same location. It is preferable that not all 640 DRAMs forming the memory segments be written during the write cycle of the operation. However, during the read phase of the operation all of the 640 DRAMs are read. A typical write-read operation sequence is initiated by the transfer of appropriate command information from the SCU to the selected command buffer in the MMC. Transfer of data to the memory sub-system is accomplished by the SCU by passing data to the MDP and passing mask information to the MMC. The MMC and MCD in combination decode the command information (the write-read command and the associated index and bank-select information). The designated address is then strobed into the selected memory segment and DRAM cycle timing is initiated under the control of the MMC. The MDPs receive a single quad-word of data per clock cycle and check long-word parity on each quad-word transfer. Seven check bits are generated for each long-word and data are transferred form the MDP to the MMU.

Under control of the MMC and MCD, the MMU receives 80 bits of data per clock cycle and loads the data into the write buffer (176 in FIG. 9) through the associated demultiplexer 174. Data are then moved to the write buffer 178 and at the proper DRAM timing data are loaded into the DRAMs and the write part of the DRAM cycle is completed.

Subsequently, the read part of the DRAM cycle begins and at the proper DRAM timing point read data are available at the DRAMs and loaded into read buffer 141 (FIG. 8). Under the control of the MMC and MCD, the DRAM timing sequence is completed and a "read ready" signal is transmitted to the SCU. Each quad-word is then transferred through the MDPs through the SCU upon receipt of a "SENDDATA" command from the SCU. Under control of the MMC, the MDPs receive a single quad-word of data per clock cycle from the MMU and check for errors and make appropriate single bit corrections if necessary and generate long-word parity. Data are then transferred from the MDPs to the SCU and the MMC subsequently updates the segment command buffer status for the SCU.

Yet another memory operation is referred to as the "write-pass data operation." This operation is based upon the same write timing as the normal write cycle, and during this operation the DRAM bypass path is used to pass data directly to the DRAM read buffers (141, 142 in FIG. 8) immediately after the DRAM write buffers (176, 178) are loaded. Since all data are valid during the write cycle, all the DRAMs constituting the segments of memory are written and data located in the DRAM read buffers are unloaded in exactly the same manner as a read operation.

Figure 10:
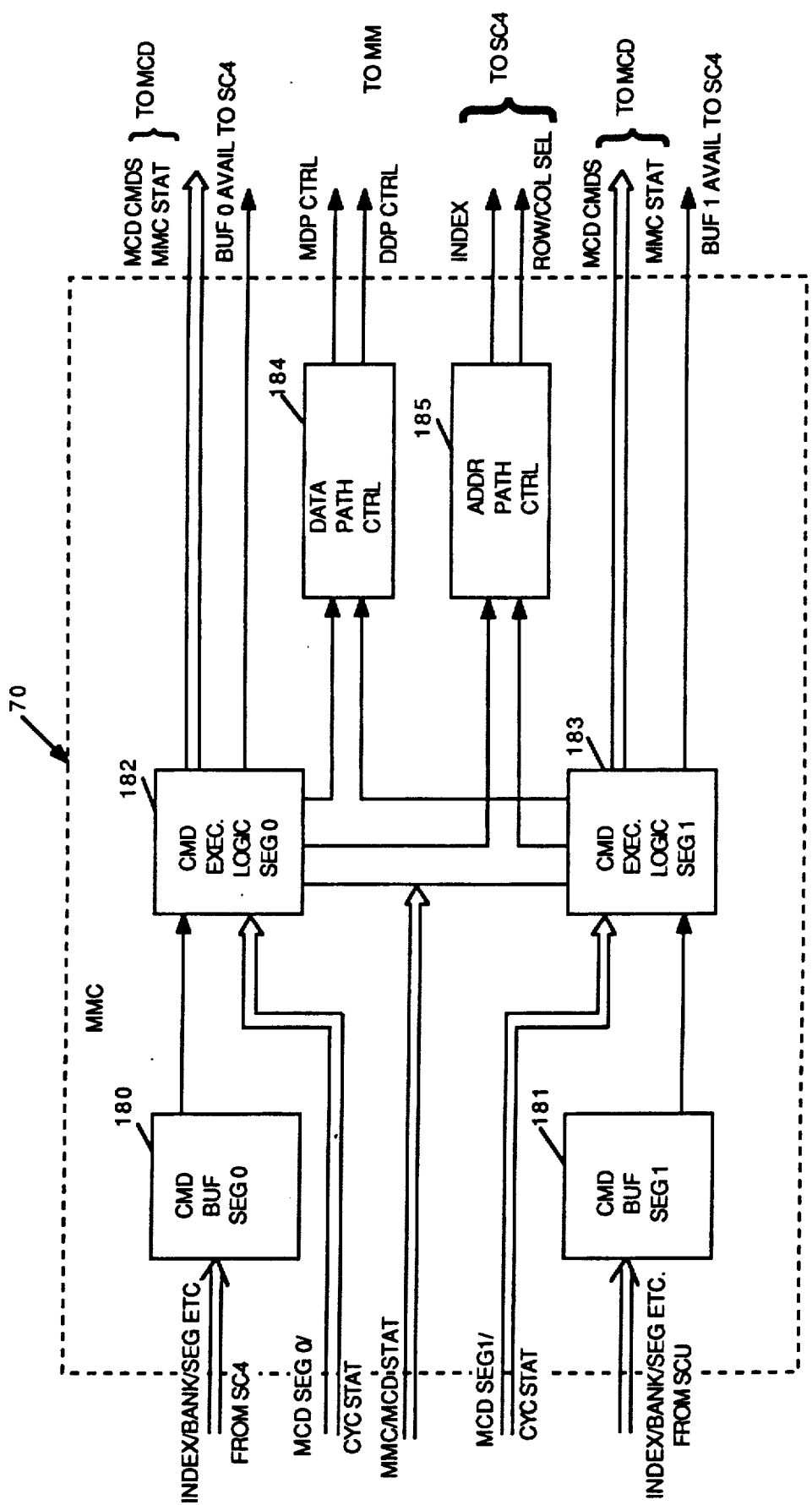
FIG. 10 is a block diagram providing a more detailed diagram of a preferred organization for the MMC module in the ACU.

Referring now to FIG. 10, there is shown a more detailed block diagram of the MMC module 70 for use with the ACU 34 of FIGS. 2 and 3. The MMC 70 includes a pair of command buffers 180 and 181 with a single command buffer being dedicated to each of the two memory segments within the MMU module 36 to which the ACU is linked. Each command buffer is preferably a 16-bit register capable of accepting command signals from the SCU including signals indicative of the memory segments being addressed, the memory bank being addressed, the specific memory operation being performed, and the desired number of quad-words of data to be transferred. A comprehensive listing of the command bit designations for regulating the operation of the segment command buffers has been provided above. The MMC 70 also includes a pair of command execution logic modules 182 and 183, each logic module being dedicated to one of the segments addressable by the MMC. The logic modules 182, 183 accept signals from the SCU indicative of status of the related segment and the status of the associated mask cycle which provide confirmation of whether or not the associated data are to be written to memory.

A data path control module 184 is provided for the generation of control signals for operation of the MDP modules (74, 76 in FIGS. 3 and 4C) and for the data path control in the DDP modules (106 in FIG. 5) on the basis of commands generated by the command execution logic 182. On a similar basis, an address path control module 185 is also provided for accepting the address portion of accepted memory commands from the command execution logic modules 182 and 183 in order to generate the index to be related to the SCU as well as the row/column select signal also to be relayed to the SCU. The command execution logic modules 182 and 183 also generate signals which are relayed directly to the SCU and include commands to the MCD module 72 for the corresponding segment and signals indicative of the status of the MMC and the availability of corresponding segment buffers for accepting memory commands from the SCU.

Figure 11:
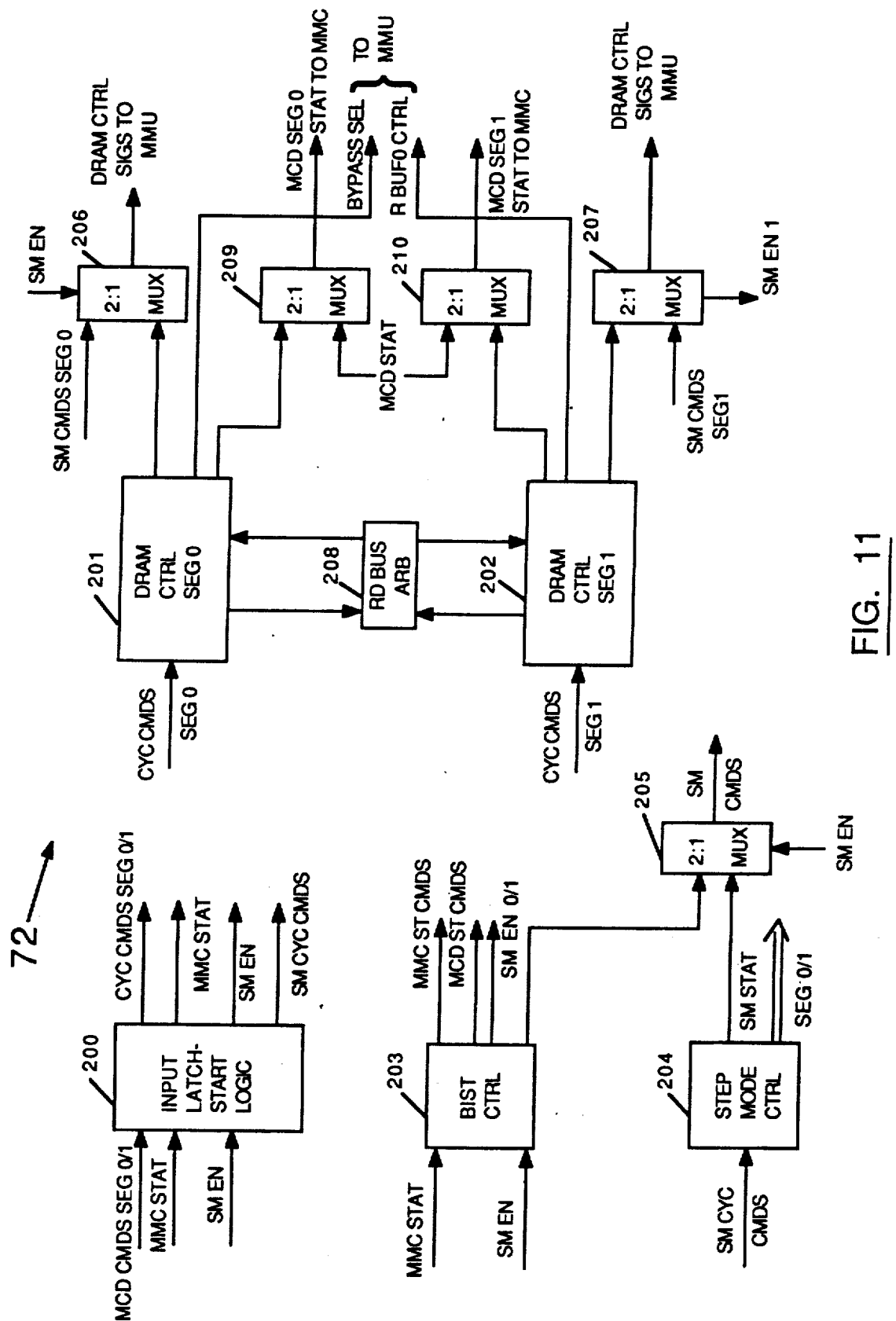
FIG. 11 is a block diagram illustrating in detail the modular composition of the MCD module in the ACU.

Referring now to FIG. 11, there is shown a detailed diagrammatic representation of a preferred modular composition for a MCD module 72 suitable for use in the ACU 34 of this invention. The MCD includes an input latch/start logic module 200 for accepting control and status commands from the MMC module 70. The signals fed to the input latch 200 include commands directed to the two segments (segment 0 and segment 1) controlled by the MCD module, the MMC status signal, and a step mode (SM) enable signal indicating to the MCD module that a particular memory operation is to be performed under the step mode of operation. In response to the control signals input to it, the input latch/start-logic module 200 generates a corresponding set of control signals including the command signals for initiating the cycling of address DRAMs.

More specifically, a cycle command signal for segment 0 is generated and provided to a DRAM controller 201 for segment 0; a corresponding cycle command signal for segment 1 is provided to a second DRAM controller 202 for segment 1. Upon receiving the cycle command, the DRAM controllers generate the DRAM control signals, including the row address select (RAS) signal, the column address select (CAS) signal, and the write enable (WE) signal, for use in controlling the action of the DRAMs located within addressed segments in the MMU.

The MCD module 72 also includes a built-in self-test (BIST) controller 203 for generating control and status signals when the memory sub-system is being cycled through a self-test mode for testing the operational integrity of the various modules comprising the sub-system. More specifically, the BIST controller 203 accepts the MMC status signal and the step mode enable signal in order to generate corresponding self-test command and status signals along with specific step mode enable signals for segments 0 and 1. The BIST controller also generates SM commands, including RAS, CAS, and WE signals, for use in controlling DRAM operation within the MMU in the self-test mode.

A step mode controller 204 is provided within the MCD 72 for accepting the SM cycle commands put out by the input latch/start logic 200 and generating corresponding SM commands, which are similar to the commands put out by the BIST controller 203 and include the CAS, RAS, and WE signals, for use in controlling DRAM operation within the MMU in the step mode. The step mode controller 204 also generates separate SM status commands for segments 0 and 1. The two sets of SM commands generated by the BIST controller 203 and the step mode controller 204 are fed to a 2:1 multiplexer 205 which allows selection of SM commands from either of these modules on the basis of the SM enabling signal relayed from the MMC to the MCD.

The SM commands selected by the MUX 205 are fed to another 2:1 multiplexer 206 which also accepts the command signals generated by DRAM controller 201 for segment 0 and permits selection of either of the input sets of commands on the basis of the SM enable command generated by the BIST controller 203 for segment 0. The output of multiplexer 206 represents the final RAS, CAS, and WE commands to be relayed to the MMU for controlling the operation of the DRAMs based in segment 0 of the MMU.

Similarly, SM commands from the MUX 205 are fed to a 2:1 MUX 207 for segment 1 which also accepts the command signals generated by the corresponding DRAM controller 202 and allows selection of either of the two input sets of commands on the basis of the SM enable command generated by the BIST controller 203 for segment 1. The output of MUX 207 represents the RAS, CAS, and WE signals to be relayed to the MMU for controlling operation of the DRAMs located in segment 1 of the MMU.

In essence, the above arrangement permits control of each of the two DRAM-based memory segments comprising the MMU on the basis of the DRAM controllers 201 and 202 disposed within the MCD during normal memory operation while permitting MCD-independent DRAM control during step mode operation. In addition, the arrangement allows DRAM control signals during step mode operation to be originated from either the step mode controller 204 or the BIST controller 203.

The DRAM controllers 201 and 202 are preferably in the form of state machines which sequence the DRAM control signals, i.e., the RAS, CAS, and WE signals, on the basis of predefined input cycle commands. The DRAM controllers are also preferably of the programmable type so that they are capable of controlling the timing of the DRAM control signals according to a predetermined correspondence with the particular frequency being used for the memory system clock. It should be noted that the two segments within an MMU that are controlled by the MCD 72 are linked through a common data path (as apparent from the interleaving arrangement of FIG. 2A). Accordingly, arbitration or prioritizing logic 208 is associated with the DRAM controllers for allowing utilization of the common data path in a non-conflicting manner.

Each of the DRAM controllers 201 and 202 also generates a status signal indicative of normal memory operation of the controller for the corresponding memory segment. These signals are multiplexed with the self-test status signals for the MCD in corresponding 2:1 multiplexers 209 and 210, respectively, on the basis of the SM enable signal generated by the BIST controller 203. The status signals generated by the DRAM controllers are relayed to the MMC during normal memory operation; during self-test operation the self-test status signal generated by the BIST controller 203 is used.

In addition, each DRAM controller 201 and 202 generates a bypass select signal for use in executing the write-pass memory operation; this signal allows the memory write path to be regulated in such a way as to bypass the access path to the DRAMs so that data being written to memory may be read directly from the write buffers without having to access the DRAMs a second time to read the same data. As noted above, the bypass select signal is relayed to the MMU and causes data that has just been written to DRAMs within a selected segment and residing in the corresponding write buffer to be latched into the corresponding read buffer for being read out instantaneously without going through a DRAM-access operation.

In response to receipt of the segment cycle commands, the DRAM controllers 201 and 202 generate a control signal for causing the latching of data from the DRAMS into the corresponding input read buffer to initiate a data read sequence as described above with respect to FIG. 8.

Figure 12:
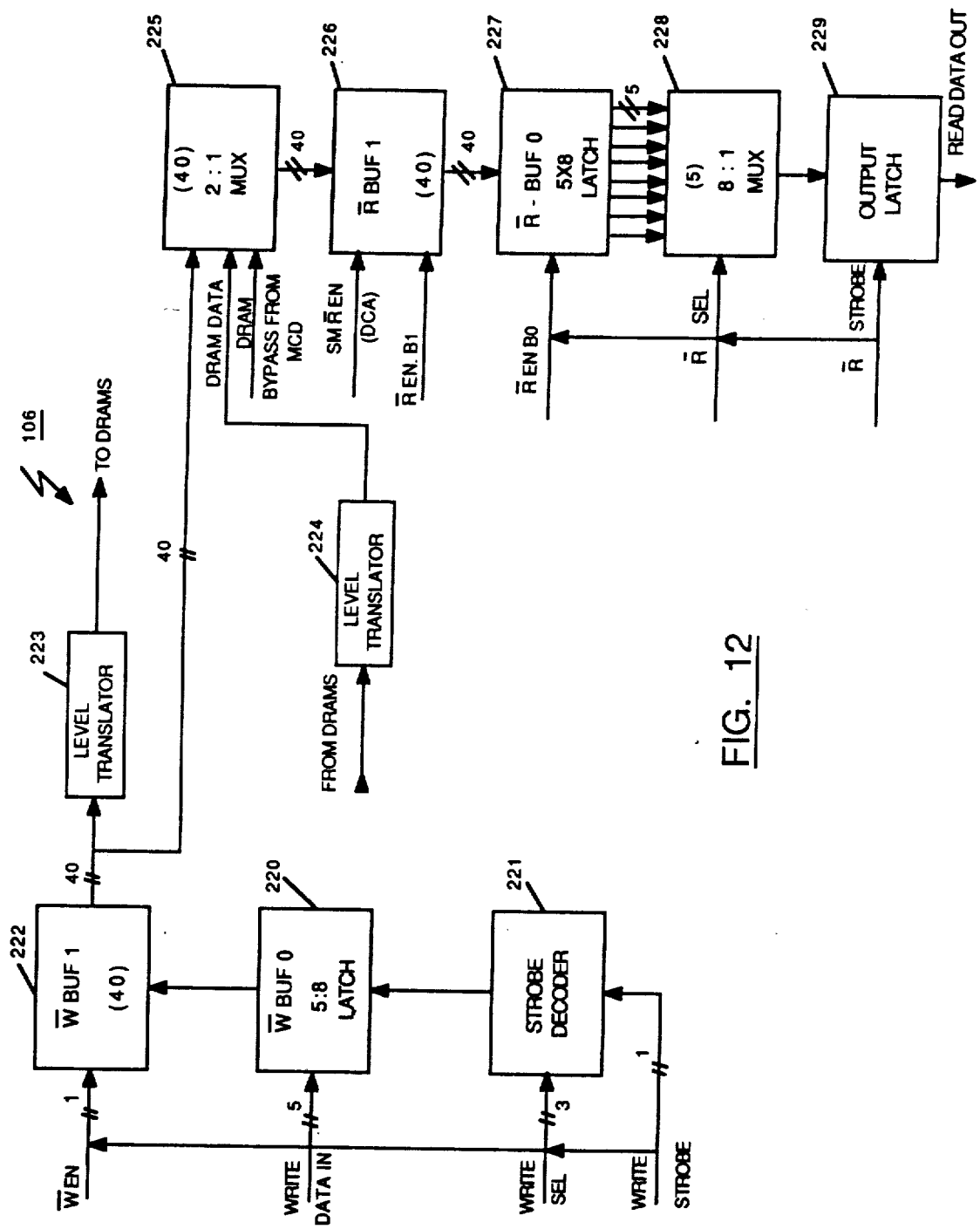
FIG. 12 is a detailed illustration of a preferred modular configuration for the DDP module of FIG. 6A.

Referring now to FIG. 12, there is shown a more detailed illustration of a preferred modular configuration for the DDP module 106 of FIG. 6 for use in accordance with the present invention. As shown in FIG. 12, write data entering the DDP module 106 is latched into a first write buffer 220 on the basis of a write select signal generated within the MMU. Data being written is preferably clocked in 5 bits at a time and the write select signal is preferably in the form of a 3-bit signal which is strobed into a decoder unit 221 on the basis of a write strobe signal also generated within the MMU module. In order to accommodate incoming 5-bit groups of data, the write buffer 220 is provided with a plurality of 5-bit latches. Preferably, eight sets of latches are provided so that up to 40 bits of data may be latched into the read buffer 220. Each incoming 5-bit group of data are latched into a selected set of latches on the basis of a load enable signal which is provided by the decoder unit 221 in response to the write select signal being clocked into the decoder unit by the write strobe signal.

The 40 bits of data stored within the first write buffer 220 is subsequently latched into a second write buffer 222 on the basis of a write enable signal generated within the MMU and provided to the buffer 222 in conjunction with the write strobe signal. Write data from buffer 222 is then transferred in a parallel manner after appropriate level translation (typically between the TTL logic used for the DRAMS to the ECL logic used generally through the memory system modules) by a level transistor unit 223 onto the DRAMs located in the corresponding memory segment.

Considering the read data path, data from addressed DRAMs is first translated to compatible logic levels by means of a level translator unit 224 and is fed to a 2:1 multiplexer 225 which also receives the 40-bit write data generated by the write buffer 222 prior to storage in memory. The multiplexer 225 is indexed by the DRAM bypass signal generated by the MCD module (see FIG. 11) and when the bypass signal is found to be asserted, the write data put out by write buffer 222 are transferred onto a first read buffer 226 for being relayed out to the SCU. On the other hand, if the DRAM bypass signal is not asserted, the multiplexer 225 transfers the 40-bit data read from the DRAMs to the first read buffer 226 on the basis of either the step mode read enable signal generated by the DCA module when the memory system is being operated under the step mode of operation, or the read enable signal for buffer 226 generated by the MCD (see FIG. 11, blocks 206, 207) module during normal memory operation.

Subsequently, data from read buffer 226 is transferred as a 40-bit data stream into a second read buffer 227 on the basis of a write enable signal for the buffer. Read buffer 227 is similar to the first write buffer 220 and includes a plurality of sets of latches. Each set of latches is capable of storing 5 bits of data on the basis of the read enable signal for the buffer in conjunction with a read select signal generated by the MMU. The 40 bits of latched data from buffer 227 are transferred in 5-bit data blocks to a 5-bit 8:1 multiplexer 228 from where data are transferred to a 5-bit output latch for eventually being transmitted to the SCU as read data on the basis of a read strobe signal relayed through the MMU. The read strobe signal is preferably a buffered clock signal which can conveniently be extracted from the programmable clock (66 in FIG. 2) provided on the SCU.

The read strobe signal also clocks the read select signal into the multiplexer 228 for identifying the particular 5-bit set of latched data that are to be transferred first to the SCU through the output latch 229; the read select signal accordingly serves to control the manner in which data are "wrapped" out to the SCU on the basis of the first quad-word requested by the system unit originating the memory command.

Figure 13:
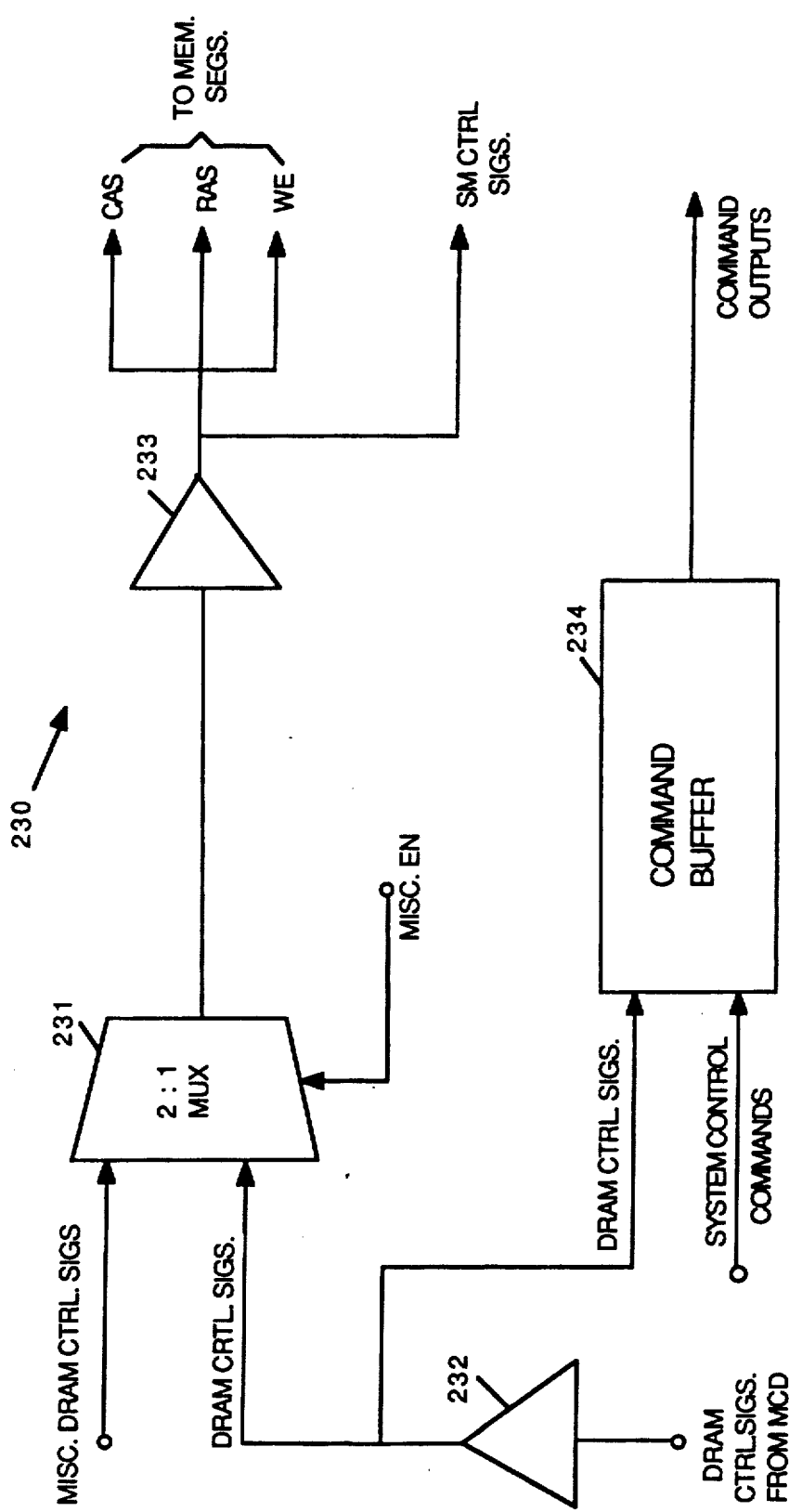
FIG. 13 is a schematic diagram illustrating the control signal path inside a DCA module for use in the memory modules of the MMU.

Turning now to FIG. 13, there is shown a schematic diagram of the control signal path, generally designated 230, in the DCA module (116 in FIGS. 5 and 6B) for use in the memory modules (100 in FIG. 5) of the MMU (36 in FIG. 2). The DCA module essentially functions as a means for buffering control signals for the DRAM-based memory segments and the generation of corresponding command signals for operation of the various modules comprising a given MMU unit. More specifically, the DCA includes a 2:1 multiplexer 231 for accepting all DRAM control signals generated by the MCD module within the ACU (as has been described above in detail). In addition, the multiplexer 231 also receives non-MMC control signals such as those generated by the step mode controller 204 and the BIST controller 203 in FIG. 11. The DRAM control signals from the MCD are fed to the MUX 231 after being translated to a suitable logic level by level translator means 232.

An enable signal which is asserted during step mode operation or self-test operation is fed to MUX 231 and serves as a basis for enabling the non-MCD DRAM control signals when the memory sub-system is being operated outside the normal mode of operation. These signals are then passed through suitable level translation means 233 and are available for being applied to corresponding memory segments. During the normal mode of operation the multiplexer 231 selects the DRAM control signals generated by the MCD as its output and these signals are subsequently level translated and are available for being applied to the DRAMs located in corresponding memory segments.

The DCA module is adapted to receive the MCD DRAM control signals, after level translation, at a command buffer 234 which also accepts other system control commands including commands for enabling the step control MUX 231, for enabling the data transfer latches during step mode operation, and for receiving refresh flags indicating the need for refresh operations to be performed on the DRAMs. The command buffer 234 is adapted to generate corresponding command outputs in response to receiving the MCD and the system control commands on the basis of predefined command outputs stored inside the command buffer 234 in correspondence with selected input commands. The command outputs generated by the command buffer 234 include signals indicative of the standby mode of operation, of the fact that a given module in the MMU is busy at a given part of the memory cycle, and of the enabling of the self-test mode of operation for the memory sub-system.

Figure 14:
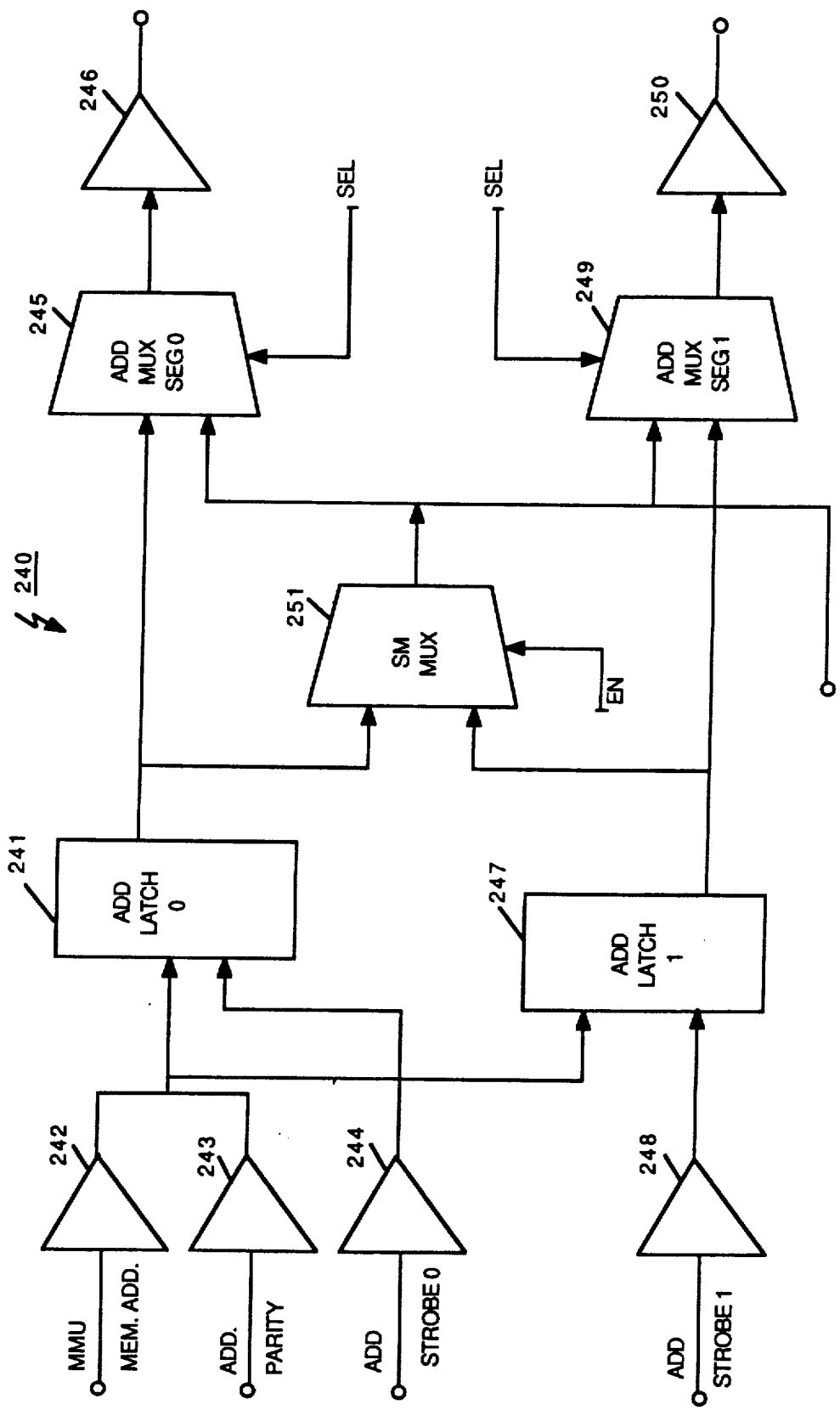
FIG. 14 is a schematic diagram illustrating the address path inside the DCA module according to the preferred memory configuration of this invention.

FIG. 14 shows a schematic diagram of the address path, generally designated 240, inside the DCA module (116 in FIGS. 5 and 6B) according to the preferred memory configuration of the invention and the manner in which memory addresses are handled by this module. The DCA address path 240 includes a first address latch 241 for accepting in combination the memory addresses provided to the MMU and the corresponding address parity bits after suitable level translation through translation means 242 and 243, respectively. The address data are then clocked into the address latch 2241 on the basis of the address strobe signal generated by the MMC unit for the corresponding memory segment after passing through level translation means 244. Memory address data from latch 241 are subsequently transferred to an address multiplexer 245 for the corresponding segment (in this case segment 0) from where it is available for being relayed to the addressed memory segment after being processed by level translator means 246.

The memory address data at the input end are also fed to a second address latch 247 corresponding to the second segment of memory within the MMU. These data are clocked into the latch 247 on the basis of the address strobe signal generated by the MMC for the corresponding segment after level translation by translation means 248 (in this case segment 1). The address data from latch 247 are subsequently transferred out to a multiplexer 249 for segment 1 from where the data are available to be relayed to the corresponding memory segment after passing through suitable level translator means 250.

During normal operation, address parity data are strobed into one of the address latches 241 and 247 depending on the particular memory segment that is being addressed. Preferably, the row address is stored in precedence to the column address. The address data are subsequently passed on through the following one of the multiplexers 245, 249 and after level translation are available for being relayed to the desired segment. The row address is clocked out first and after a predetermined delay the column address becomes available. During self-test operation, essentially the same sequence described above is executed. However, the address data that gets strobed into the address latches are the memory addresses generated by the MMU module through a conventional address pattern generator (not shown) for test purposes. The subsequent multiplexing and level translation operations performed upon the strobed data are identical to those executed during the normal mode of operation.

The address data from latches 241 and 247 corresponding respectively to segment 0 and segment 1 can also be fed as separate inputs to a step mode multiplexer 251 which provides a separate address path allowing address data to be routed away from the DRAM controller means during step mode operation. During the step mode of operation the multiplexer 2251 operates to selectively channel row and column addresses to corresponding memory segments. More specifically, in the step mode, row and column addresses are not stored sequentially with the same address latch. Instead, the incoming memory address is split so that the row and column addresses are separated and fed separately to the address latches. The row address, for instance, is stored at latch 241 while the column address gets stored at latch 247. Both the row and column address are subsequently latched and channeled through the step mode multiplexer too the designated memory segment (Segment 0 or 1) after being processed by the corresponding address multiplexer (245 or 249) and level translator (246 or 250).

Figure 15:
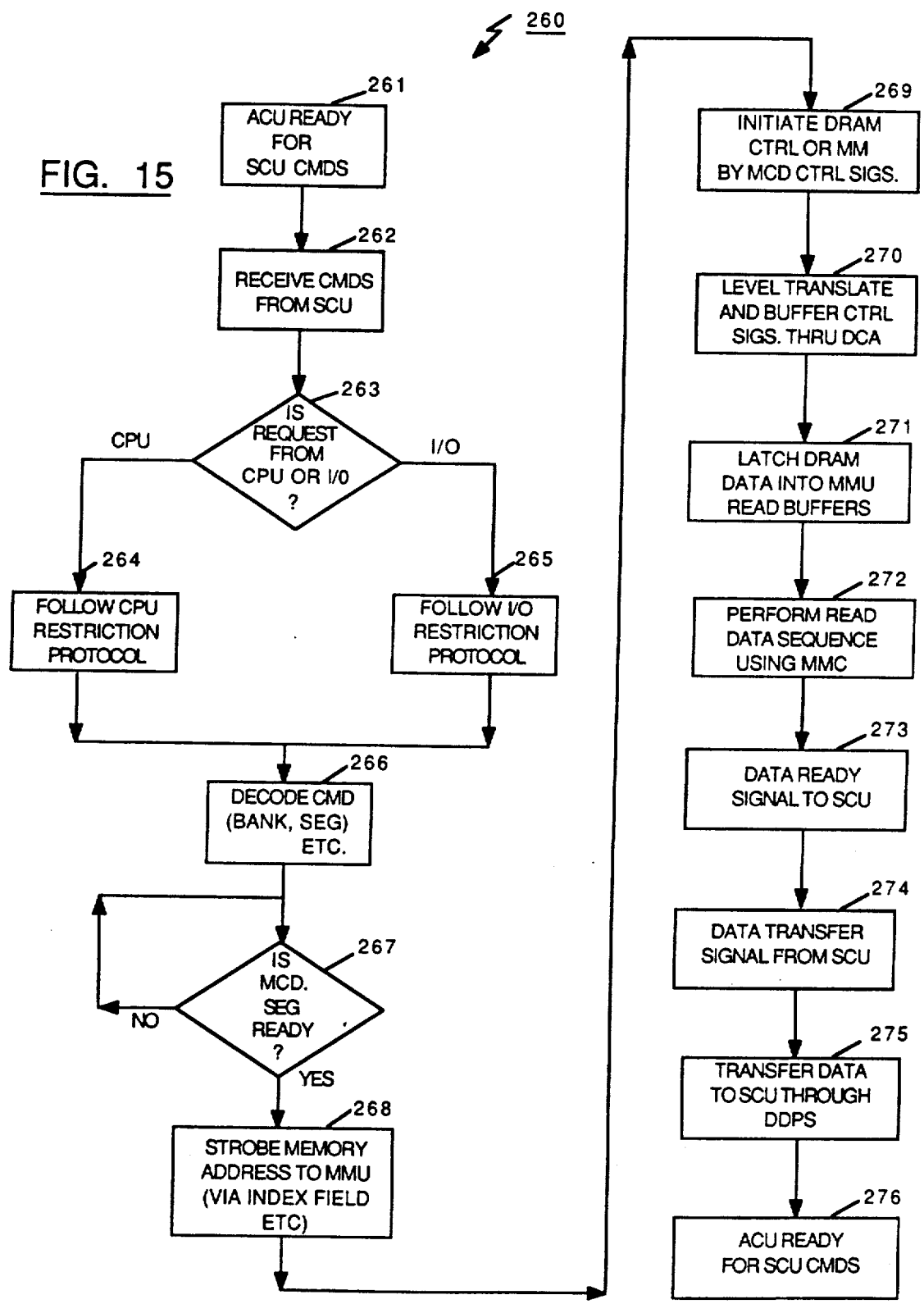
FIG. 15 is a simplified flowchart illustrating the basic procedure involved in executing a memory operation, according to this invention.

Turning now to FIG. 15, there is shown a simplified flowchart generally designated 260 illustrating the interfacing action provided according to the system of this invention in executing a typical read-from-memory request.

The interfacing action is initiated at step 261 by the transmission of a signal from the ACU to the SCU indicating that a command buffer is available for accepting memory commands. At step 262, a memory command prioritized for execution by the SCU is transferred to the ACU along with the corresponding index field. The received memory command is checked at step 263 to determine whether the command was initiated by a system CPU or I/O unit so that the appropriate protocol of restrictions applicable to either a CPU or I/O memory operation may be followed. More specifically, if the requesting unit is found to be a CPU, step 264 is initiated and the memory system follows the CPU restriction protocol which preferably includes the restriction of write transfers to eight quad-words at a time and the specification of a single mask bit for every longword of transferred data.

If the requesting unit is found to be I/O unit, step 265 is undertaken wherein the I/O protocol of restrictions is followed wherein write transfers are preferably permitted for any one of 1, 2, 4, 6, or 8 quad-words. In addition, a single mask bit is preferably specified for every byte of transferred data in the case of I/O operations.

Subsequently, at step 266, the accepted memory command is decoded to provide an indication, among other things, of the particular segment and bank of memory being accessed.

At step 2267, a check is performed too see if the MCD module is available for performing memory commands; the MCD module provides an indication at this stage of whether or not the required segment of memory is available. If the address memory segment is available the corresponding memory address is strobed inn the MMU using the index field and the row/column select signal relayed back to the SCU.

DRAM control of the memory module is subsequently initiated, at step 269, by means of the DRAM control signals generated by the MCD. At step 260, the buffering of the MCD-generated control signals and appropriate level translation is performed through the DCA modules.

Read data from the addressed memory segments is subsequently latched into the read buffer of the memory module, at step 271. After the latching of DRAM data, the MMC read data transfer sequence is performed at step 272 and a "data ready" indication is subsequently transferred to the SCU from the MMC at step 273.

When the SCU is ready to accept requested data, a "data transfer" indication signal is transmitted to the MMC, at step 274. This results in the transfer of requested read data to the SCU through the DDP modules at step 275 along with information indicating the starting data bits designated by the executed memory command. At this stage read data are transferred to the system unit which originated the memory command and subsequently the ACU is available at step 276 for receiving and executing the next memory command on the priority list generated by the SCU.

Error detection and correction in signals processed by and relayed through the ACU is accomplished by standard dedicated ECC logic (not shown) provided on the ACU module. Error detection logic allows detection of single intermittent failures and operates upon parity bits attached to all signal groups except those running between the ACU and the MMU. More particularly, all signal groups relayed between the SCU and the ACU as well as those between the modular macro-cell arrays within the ACU itself are parity protected. The direct address path from the SCU to the MMU is also protected by parity bits. The control path between the ACU and the MMU is provided with parity checking while the data path between the ACu and the MMU is provided with ECC check bits; odd parity calculations are calculated by the MMU and relayed back to the ACU because the absence of system clock timing makes latching of control signals difficult.

Correction of errors, and more specifically, single bit error correction and double bit error detection on stored data are performed by standard ECC logic included on the ACU. Reporting of data errors is done through the use of error registers located in the ACu, whose contents are transferred after detection of errors via the data path described above the SPU 18 (FIG. 2) through the control logic section of the SCU. The ACU ensures system integrity by bypassing the usual reporting mechanism (i.e., through the error register dumping process) when fatal errors, such as those relating to control and address signals, are detected.

For accomplishing this, the ACU is designed to have a single output signal line on each macro-cell array module on which the ACU modular structure is based dedicated for reporting fatal errors. All fatal error signals are routed to a single macro-cell array module, preferably the MMC 70 on the ACU 34 (FIG. 3) for efficient handling. The MMC 70 routes a reported fatal error signal directly to the appropriate control logic in the SCU, which in turn relays the signals to the service processor unit 18. Through its control lines the SPU 18 (FIG. 2) causes the system clocks to be halted and the system proceeds functioning through appropriate SPU initiated handshaking, under a scan mode of operation wherein memory modules are put on standby operation and refresh cycles are activated on the DRAMs so that contents of memory are not comprised. The above process ensures that fatal errors are promptly reported and allows rectifying measures to be undertaken under the scan mode of operation.

We claim:
1. A multi-processing computer system comprising:
   a plurality of system units including a plurality of central processing units (CPUs);
   a system memory for storage of data, said system memory comprising at least one memory unit containing independently accessible memory segments; and
   means for prioritizing memory access requests from said system units to said system memory too permit said system units to share access to said system memory during simultaneous operation of said system units;
   wherein said memory unit includes:
      means for providing a first dedicated data path for the transfer of read data (the "read path") from addressed memory segments to said system units;
      means for providing a second dedicated data path (the "write path") for the transfer of write data received from said system units too addressed memory segments;
      means for providing a third dedicated path for transfer of memory addresses (the "address path") from the system units to identify addressed memory segments; and
      means for reading data that is being written to addressed segments of memory without accessing addressed memory segments by transferring write data from said second dedicated data path to said first dedicated data path so that the transferred write data may subsequently be transferred as read data to said system units.
2. The multi-processing system of claim 1, wherein said system memory comprises a plurality of banks of

DRAMs, said banks having memory addresses which are interleaved on boundaries of memory address blocks having a predetermined size.

3. A multi-processing computer system comprising:
 a plurality of system units including a plurality of central processing units (CPUs);
 a system memory for storage of data, said system memory comprising at least one memory unit containing independently accessible DRAM-based memory segments; and
 a system control unit (SCU) interconnecting said system units to said system memory for the transfer of memory access requests from said system units to said system memory and for the transfer of data between said system units and said system memory, said system control unit including means for prioritizing said memory access requests to permit said system units to share access to said system memory during simultaneous operation of said system units; and
 interface means for establishing communication between said SCU and said system memory;
 wherein said memory unit includes:
  means for providing a first dedicated data path for the transfer of read data (the "read path") from addressed memory segments to said interface means for transfer to said system control unit;
  means for providing a second dedicated data path (the "write path") for the transfer of write data received from said system control unit through said interface means to addressed memory segments;
  means for providing a third dedicated path for transfer of memory addresses (the "address path") from the system control unit to identify addressed memory segments and banks of memory and the DRAMs disposed therein; and
  means for reading data that is being written to addressed segments of memory without accessing addressed memory segments by transferring write data from said second dedicated data path to said first dedicated data path so that the transferred write data may subsequently be transferred as read data to said interface means for transfer to said system control unit.

4. The multi-processing system of claim 3, wherein each of said memory segments comprising said main memory unit comprises a plurality of banks of DRAMs, said banks having memory addresses which are interleaved on boundaries of blocks having a predetermined size.

5. The multi-processing system of claim 4, wherein the main memory unit further includes:
 means for accepting control signals for said DRAMs comprising said memory segments and banks;
 means for generating corresponding predefined memory control command in response thereto; and
 means for transferring selected ones of said DRAM control signals to corresponding addressed memory segments.

6. The multi-processing system of claim 3 wherein said means for providing said first dedicated data path includes:
 means for accessing addressed segments and banks of memory to retrieve data stored therein;
 means for translating said retrieved data to preferred logic levels; and
 means for transferring selected groups of said stored data to said interface means according to a selected order for subsequent transfer to the system control unit.

7. The multi-processing system of claim 3 wherein said means for providing said second dedicated data path includes:
 means for accepting and storing data to be written to memory from said interface means in selectively ordered data groups; l
 means for translating said data to preferred logic levels; and
 means for accessing addressed segments and banks of memory in order to store therein said received write data.

8. The multi-processing system of claim 3 wherein said main memory unit further comprises means for generating control signals for controlling the operation of said means providing said first dedicated data path and said second dedicated data path.

9. A multi-processing computer system comprising:
 a plurality of system units including a plurality of central processing units (CPUs) and at least one input-output (I/O) unit;
 a system memory for storage of data, said system memory comprising at least one memory unit containing independently accessible DRAM-based memory segments; each segment comprising a plurality of banks of DRAMs, said banks having memory addresses that are interleaved on boundaries of blocks having a predetermined size; and
 a system control unit (SCU) interconnecting said system units to said system memory for the transfer of memory access requests from said system units to said system memory and for the transfer of data between said system units and said system memory, said system control unit including means for prioritizing said memory access requests to permit said system units to share access to said system memory during simultaneous operation of said system units; and
 interface means for establishing communication between said SCU and said system memory, said interface means including means for receiving and executing memory commands from the system control unit by transferring associated data between the system control unit and addressed segments of memory;
 wherein said memory unit includes:
  means for providing a first dedicated data path for the transfer of read data (the "read path") from addressed memory segments to said interface means for transfer to said system control unit;
  means for providing a second dedicated data path (the "write path") for the transfer of write data received from said system control unit through said interface means to addressed memory segments;
  means for providing a third dedicated path for transfer of memory addresses (the "address path") from the system control unit too identify addressed memory segments and banks of memory and the DRAMs disposed therein; and
  means for reading data that is being written to addressed segments of memory without accessing addressed memory segments by transferring write data from said second dedicated data path to said first dedicated data path so that the transferred write data may subsequently be transferred as read data to said interface means for transfer to said system control unit.

10. The multi-processing system of claim 9, wherein the main memory unit further includes:
   means for accepting control signals for said DRAMs comprising said memory segments and banks;
   means for generating corresponding predefined memory control commands in response thereto; and
   means for transferring selected ones of said DRAM control signals to corresponding addressed memory segments.

11. The multi-processing system of claim 9 wherein said means for providing said first dedicated data path includes:
   means for accessing addressed segments and banks of memory to retrieve data stored therein;
   means for translating said retrieved data too preferred logic levels; and
   means for transferring selected groups of said stored data to said interface means according too a selected order for subsequent transfer to the system control unit.

12. The multi-processing system of claim 9 wherein said means for providing said second dedicated data path includes:
   means for accepting and storing data too be written to memory from said interface means in selectively ordered data groups;
   means for translating said data to preferred logic levels; and
   means for accessing addressed segments and banks of memory in order to store therein said received write data.

13. The multi-processing system of claim 9 wherein said main memory unit further comprises means for generating control signals for controlling the operation of said means providing said first dedicated data path and said second dedicated data path.

* * * * *